(12) United States Patent
Oh et al.

(10) Patent No.: US 7,683,865 B2
(45) Date of Patent: Mar. 23, 2010

(54) DETACHABLE LIQUID CRYSTAL DISPLAY DEVICE

(75) Inventors: Eui-Yeol Oh, Gyeonggido (KR);
Nam-Yong Kong, Gyeonggido (KR);
Ki-Duk Kim, Gyeonggido (KR);
Seong-Man Jeon, Seoul (KR); Tae-Ho You, Incheon (KR); Hee-Jeong Park, Gyeonggido (KR)

(73) Assignee: LG Display Co., Ltd., Seoul (KR)

( * ) Notice: Subject to any disclaimer, the term of this patent is extended or adjusted under 35 U.S.C. 154(b) by 1046 days.

(21) Appl. No.: 11/023,595

(22) Filed: Dec. 29, 2004

(65) Prior Publication Data
US 2005/0168422 A1    Aug. 4, 2005

(30) Foreign Application Priority Data

| Dec. 29, 2003 | (KR) | 10-2003-0098891 |
|---|---|---|
| Dec. 31, 2003 | (KR) | 10-2003-0101680 |
| Dec. 31, 2003 | (KR) | 10-2003-0101681 |

(51) Int. Cl.
*G09G 3/36* (2006.01)

(52) U.S. Cl. .......... 345/87; 345/102; 345/905; 361/681

(58) Field of Classification Search .......... 345/87, 345/905, 102; 361/681; 362/26
See application file for complete search history.

(56) References Cited

U.S. PATENT DOCUMENTS

| 5,574,477 | A * | 11/1996 | Shimizu et al. | 345/102 |
|---|---|---|---|---|
| 5,844,773 | A * | 12/1998 | Malhi | 361/681 |
| 6,512,670 | B1 * | 1/2003 | Boehme et al. | 361/681 |
| 6,767,253 | B1 * | 7/2004 | Werner et al. | 439/638 |
| 6,937,258 | B2 * | 8/2005 | Lim et al. | 345/204 |
| 6,943,770 | B2 * | 9/2005 | Garcia et al. | 345/102 |
| 6,989,987 | B1 * | 1/2006 | Wilson et al. | 361/681 |

* cited by examiner

*Primary Examiner*—Kevin M Nguyen
(74) *Attorney, Agent, or Firm*—Birch, Stewart, Kolasch & Birch, LLP

(57) ABSTRACT

A detachable liquid crystal display device includes a liquid crystal module and a cradle. The liquid crystal module includes a liquid crystal panel; an optical sheet provided on a rear surface of the liquid crystal panel; an interface disposed on a rear surface of the liquid crystal panel; a power receiver disposed on the rear surface of the liquid crystal panel; a memory card; and a timing controller for receiving second image data from external devices and permitting the first image data stored in the memory card to be displayed in the liquid crystal panel. The cradle includes a lamp emitting light; an inverter for supplying alternating current to the lamp; a connector for receiving third image data from external equipment; and an interface converter for applying the third image data to the interface of the liquid crystal module.

13 Claims, 23 Drawing Sheets

DETACHABLE LIQUID CRYSTAL DISPLAY DEVICE

The present invention claims the benefit of Korean Patent Applications Nos. 2003-0098891, 2003-0101680 and 2003-0101681 filed in Korea on Dec. 29, 2003, Dec. 31, 2003, and Dec. 31, 2003, respectively, which are hereby incorporated by reference.

BACKGROUND OF THE INVENTION

1. Field of the Invention

The present invention relates to a liquid crystal display device, and more particularly, to a portable liquid crystal module.

2. Discussion of the Related Art

In general, flat panel display devices are thin, light weight, and have low power consumption. Thus their application in portable devices is increasing. Among the various types of flat panel display devices, liquid crystal display (LCD) devices are widely used for laptop computers, televisions and desktop monitors because of their superiority in resolution, color image display, and display quality.

LCD devices make use of optical anisotropy and polarization properties of liquid crystal molecules to generate a desired image. In particular, liquid crystal molecules can be aligned in a specific orientation by controlling the application of an electric field across the liquid crystal molecules. Due to optical anisotropy, incident light is refracted according to the orientation of the liquid crystal molecules, thereby generating the desired image.

FIG. 1 is a perspective view of a liquid crystal display device according to related art. In FIG. 1, the liquid crystal display includes a liquid crystal panel 10, a backlight assembly 20, a top case 31 and a rear case 32. Although not shown in FIG. 1, the liquid crystal panel 10 includes two substrates with a liquid crystal layer disposed between them. The backlight assembly 20 is positioned under the liquid crystal panel 10 and functions to supply light to the liquid crystal panel 10. The top and rear cases 31 and 32 accommodate and fix the liquid crystal panel 10 to the backlight assembly 20.

There are two types of backlight assemblies 20, an edge type and a direct type, based on the arrangement of the light source within the liquid crystal display device. In particular, an edge type backlight device has a light source installed at one or both side portions of the light crystal panel 10, and a direct type backlight device has a light source installed underneath the liquid crystal panel 10. Usually, laptop computers adopt the edge type backlight assembly in order to reduce their size and thickness. However, televisions and computer monitors adopt the direct type where the light guide plate and some prism sheets are omitted for the purpose of raising the brightness thereof. For example, the 26-inch television includes sixteen cold cathode fluorescent (CCF) lamps, as the direct type. The backlight assembly 20 further includes functional optical films, e.g., diffusions sheets, as well as lamp(s).

FIG. 2 is a sectional diagram illustrating an edge type backlight assembly according to related art. In FIG. 2, light emitted from a lamp 21 passes through a light guide plate 22. The light guide plate 22 guides the incident light toward a diffusion sheet 25 and other optical sheets 27. The linear light emitted from the lamp 21 is converted into surface light by passing through the light guide plate 22, the diffusion sheet 25 and optical sheet 27. The backlight assembly includes a reflector 24 provided underneath the light guide plate 22 to reflect the light upwardly, and the light guide plate 22 includes a plurality of micro-patterns 22a for increasing the reflective efficiency.

However, since the liquid crystal display device includes both the liquid crystal panel and the backlight assembly together, the liquid crystal panel may be damaged by heat emitted from the lamp of the backlight assembly. For example, the circuits of the liquid crystal panel may become broken, and the inverter may malfunction.

Additionally, when the light guide plate is formed to be thin for the purpose of obtaining a thin LCD device, the lamp is also formed to have a small diameter with reduced capacity. Therefore, the optical sheets need to have a good quality of improved light-passing efficiency and may be high in price.

SUMMARY OF THE INVENTION

The present invention is directed to a liquid crystal device that substantially obviates one or more of the problems due to limitations and disadvantages of the related art.

Accordingly, an object of the present invention is to provide a portable liquid crystal module that is detachable from the light source.

Another object of the present invention is to provide a portable liquid crystal module having a memory device.

A further object of the present invention is to provide a liquid crystal display device having a detachable liquid crystal module and a cradle.

A further object of the present invention is to provide a cradle that has a light source and is assembled with a portable liquid crystal module.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a detachable liquid crystal display device includes a liquid crystal module including: a) a liquid crystal panel; b) an optical sheet provided at a rear surface of the liquid crystal panel; c) an interface disposed on a rear surface of the liquid crystal panel and receiving first image data and image control signals; d) a power receiver disposed on the rear surface of the liquid crystal panel and receiving electrical power; e) a memory card for storing the first image data; and f) a timing controller for receiving second image data from external devices in accordance with the image control signals and letting the first image data stored in the memory card to be displayed in the liquid crystal panel; and a cradle including: a) a lamp for emitting light to the optical sheet; b) an inverter for supplying an alternating current to the lamp; c) a connector receiving third image data from external equipment; and d) an interface converter for applying the third image data to the interface of the liquid crystal module.

In another aspect of the present invention, a detachable liquid crystal display device includes a double-sided liquid crystal module including a light guide plate, first optical sheets provided on a front surface of the light guide plate, second optical sheets provided on a rear surface of the light guide plate, a first liquid crystal panel provided on the first optical sheets, and a second liquid crystal panel provided on the second optical sheets; a lamp disposed adjacent to a side portion of the light guide plate; and a cradle including an interface converter for supplying image data and electrical power to the double-sided liquid crystal module.

In a further aspect of the present invention, a detachable liquid crystal display device includes a liquid crystal module including: a) a liquid crystal panel; b) an optical sheet provided on a rear surface of the liquid crystal panel; and c) spring-type interface receiving image data provided at the periphery; and a cradle including: a) a lamp for emitting light to the optical sheet; b) an inverter for supplying alternating current to the lamp; c) a connector for receiving the image data from external equipment; and d) an interface converter for applying the image data to the spring-type interface.

It is to be understood that both the foregoing general description and the following detailed description are merely exemplary and explanatory in nature and are intended to provide further explanations of the present invention.

BRIEF DESCRIPTION OF THE DRAWINGS

The accompanying drawings, which are included to provide a further understanding of the invention and are incorporated in and constitute a part of this specification, illustrate embodiments of the present invention and together with the description, serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, similar reference numbers will be used throughout the drawings to refer to the same or like elements.

Figure 1:
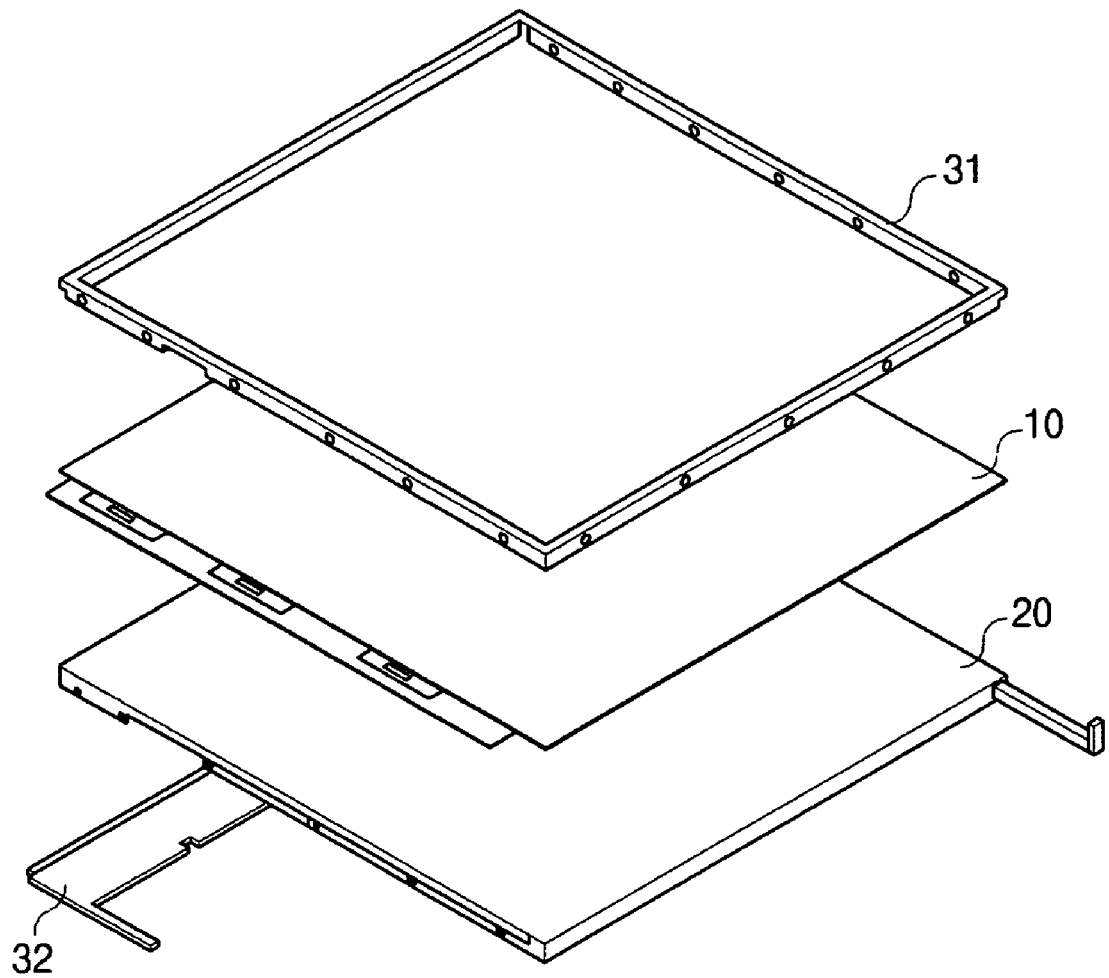
FIG. 1 is a perspective view of a liquid crystal display device according to related art.
Figure 2:
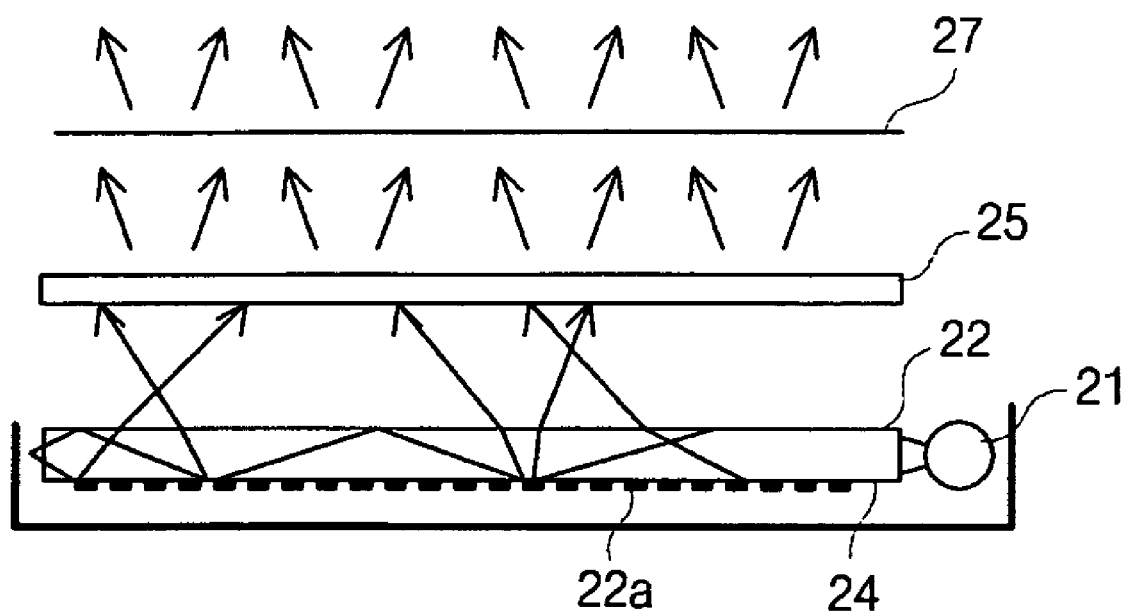
FIG. 2 is a sectional diagram illustrating an edge type backlight assembly according to related art.
Figure 3:
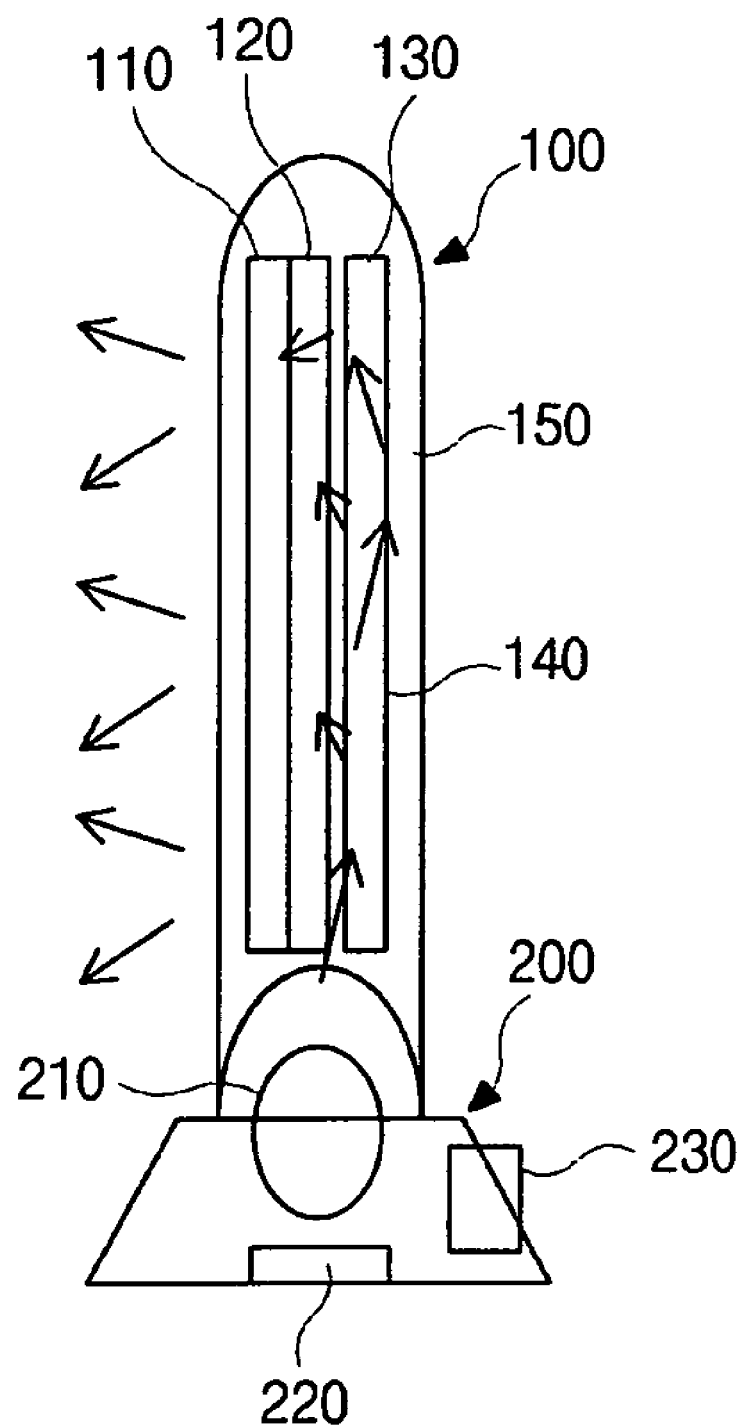
FIG. 3 is a conceptual sectional diagram illustrating an exemplary detachable liquid crystal display (LCD) device according to the present invention.

FIG. 3 is a conceptual sectional diagram illustrating an exemplary detachable liquid crystal display (LCD) device according to the present invention. The detachable LCD device includes a liquid crystal module 100 and a cradle 200. The liquid crystal module 100 includes a liquid crystal panel 110, a functional optical film 120, a light guide plate 130, a reflector 140, and a housing 150 for accommodating all of the elements. The cradle 200 is coupled with the liquid crystal module 100, and includes a lamp 210, an inverter 220, and a connector 230. The lamp 210 emits light and supplies the emitted light to the light guide plate 130. The inverter 220 provides the lamp 210 with an alternating current. The corrector 230 receives image information from exterior equipment. The connector 230 may include a DVI (Digital Video Interface) input, a S-video input, a component input, a composite video input, and a USB (Universal Serial Bus) input. For example, the DVI input is used for TV and video, the composite input is used for the digital camera, the S-video input is used for TV, the USB input is used for the computer, and the component input is used for the TFT.

Figure 4:
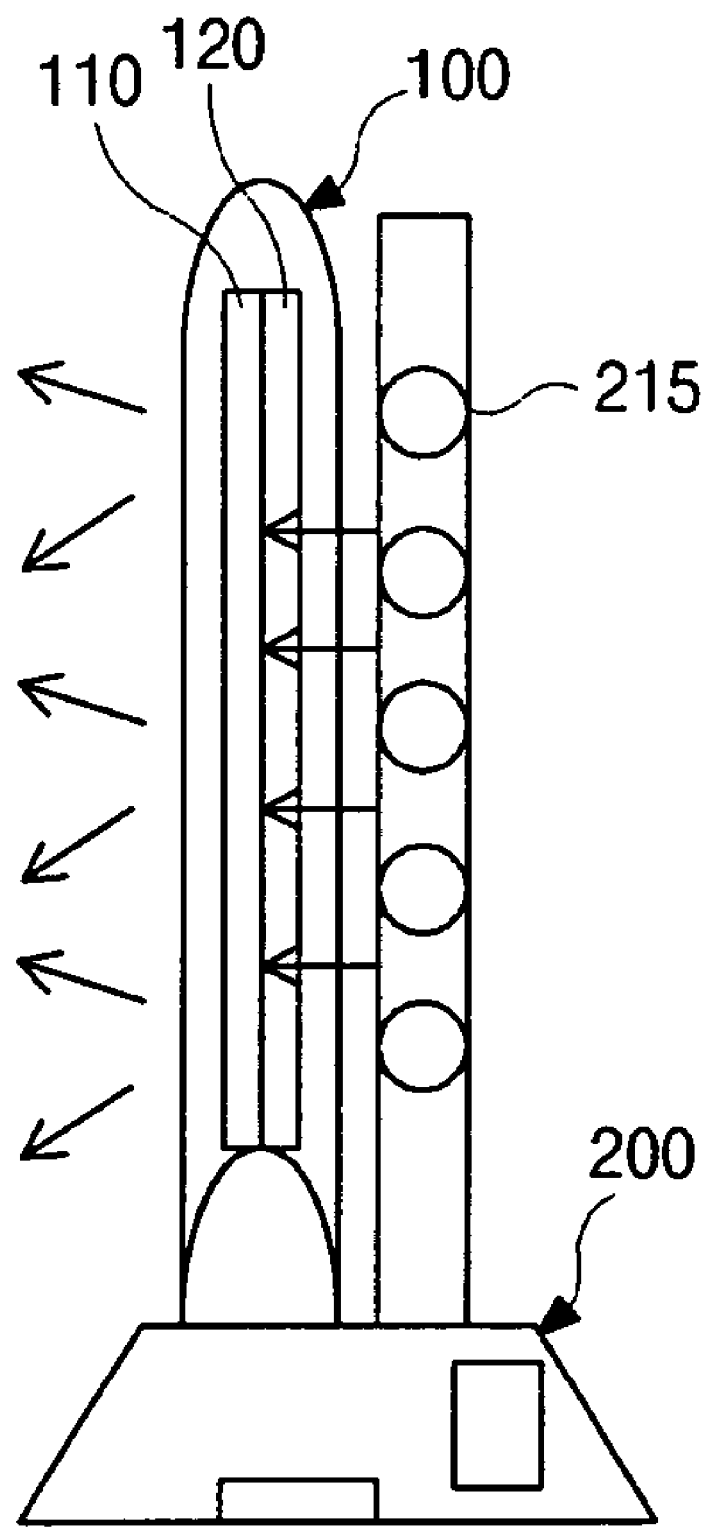
FIG. 4 is a conceptual sectional diagram illustrating another exemplary detachable liquid crystal display (LCD) device according to the present invention.

FIG. 4 is a conceptual sectional diagram illustrating another exemplary detachable liquid crystal display (LCD) device according to the present invention. Unlike the detachable LCD device of FIG. 3 which has the edge type light source, the detachable LCD device of FIG. 4 has the direct type light source. In FIG. 4, the detachable LCD device has a liquid crystal module 100 and a cradle 200. The liquid crystal module 100 includes a liquid crystal panel 110 and a functional optical film 120, but does not include the light guide plate unlike that shown in FIG. 3 because the cradle 200 includes a direct type light source where a plurality of lamps 215 are disposed in a rear position of the liquid crystal panel 110. Therefore, the light emitted from the lamps 215 directly proceeds toward the liquid crystal panel 110 and passes through it to display images. The detachable LCD device of FIG. 4 is usefully adopted for computer monitors and televisions. Unlike the edge type, the direct type of FIG. 4 does not require the reflector and the light guide plate.

Figure 5:
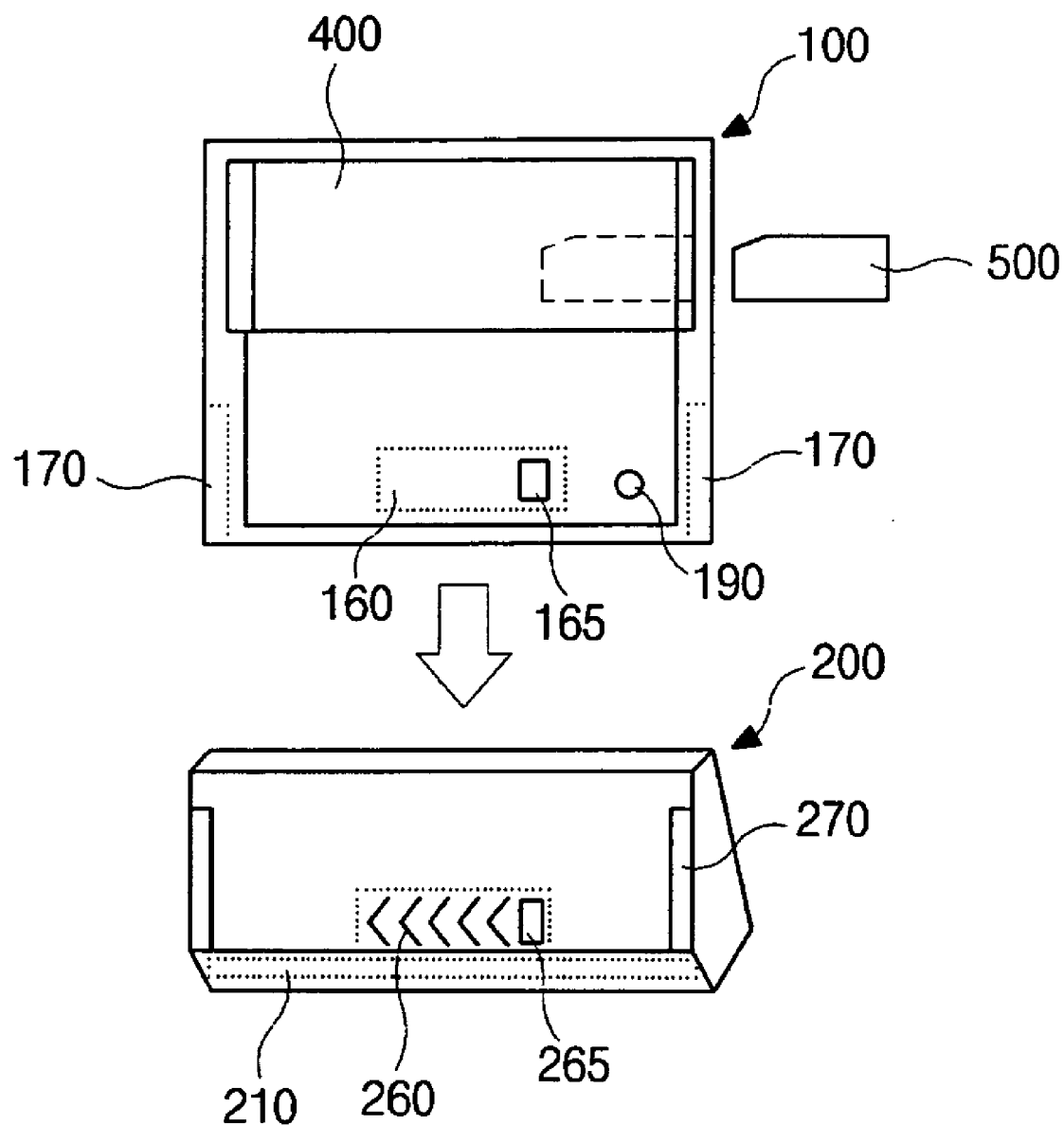
FIG. 5 illustrates the coupling of a liquid crystal module with a cradle.

FIG. 5 illustrates the coupling of a liquid crystal module with a cradle. A first interface connector 160 is disposed on a rear surface of the liquid crystal module 100, and a pair of slide-grooves 170 is formed on both sides of the liquid crystal module 100. A pair of slide-protrusions 270, which correspond to the pair of slide-grooves 170, is formed on both sides of the cradle 200. The slide-grooves 170 slide into the cradle 200 to be coupled with the slide-protrusions 270 such that the liquid crystal module 100 is connected to the cradle 200. A second interface connector 260 is disposed in the cradle 200 in a position corresponding to the first interface connector 160, whereby the first interface connector 160 contacts the second interface connector 260 when the liquid crystal module 100 is coupled with the cradle 200. Although FIG. 5 only shows the pair of slide-grooves 170 and slide-protrusions 270, there may be more than two and also other fixation devices may possibly be adopted. The first and second interface connectors 160 and 260 may adopt an LVDS (Low Voltage Differential Signaling) transmission system. The LVDS is a generic multi-purpose interface standard with a low-power/low-noise differential technology for high speed transmission. Optimized for point-to-point configurations in telecom, datacom, peripherals and displays, the LVDS delivers the bandwidth necessary for driving large data rates over PCB and cable. The LVDS may have data rates up to 1.2 Gbps.

The third and fourth interface connectors 165 and 265 are formed, respectively, in the liquid crystal module 100 and in the cradle 200, and are used to supply electrical power to the liquid crystal module 100. Further, the third and fourth interface connectors 165 and 265 correspond to and are connected to each other, when the liquid crystal module 100 is coupled with the cradle 200. The third and fourth interface connectors 165 and 265 are embodied in the first and second interface connectors 160 and 260, respectively, but they may be separately provided. The liquid crystal module 100 may include a battery 400, and the third interface connector 165 may be connected to the battery 400, whereby the third and fourth interface connectors 165 and 265 are used for charging the battery. When the liquid crystal module 100 is detached from the cradle 200, the liquid crystal module 100 may use the electrical power stored in the battery 400. The liquid crystal module 100 includes a power input 190 where the external electrical power is directly supplied. Therefore, when the liquid crystal module 100 is detached from the cradle 200, the liquid crystal module 100 may receive external electrical power through the power input 190 instead of using the battery 400. The liquid crystal module 100 may have a space for a memory card 500 that is detachable from the liquid crystal module 100. The cradle 200 also includes a lamp 210 in a bottom portion thereof, whereby light emitted from the lamp 210 may be delivered to the liquid crystal module 100 when the liquid crystal module 100 is coupled with the cradle 200. The memory card 500 of the present invention is a re-writable disk or compact flash memory card which may store text files, voice files, moving picture files and other multimedia files. The memory card 500 may be similar to the storage device commonly used in digital cameras, camcorders, mobile phones, PDA's, PC's and other digital instruments.

Figure 6:
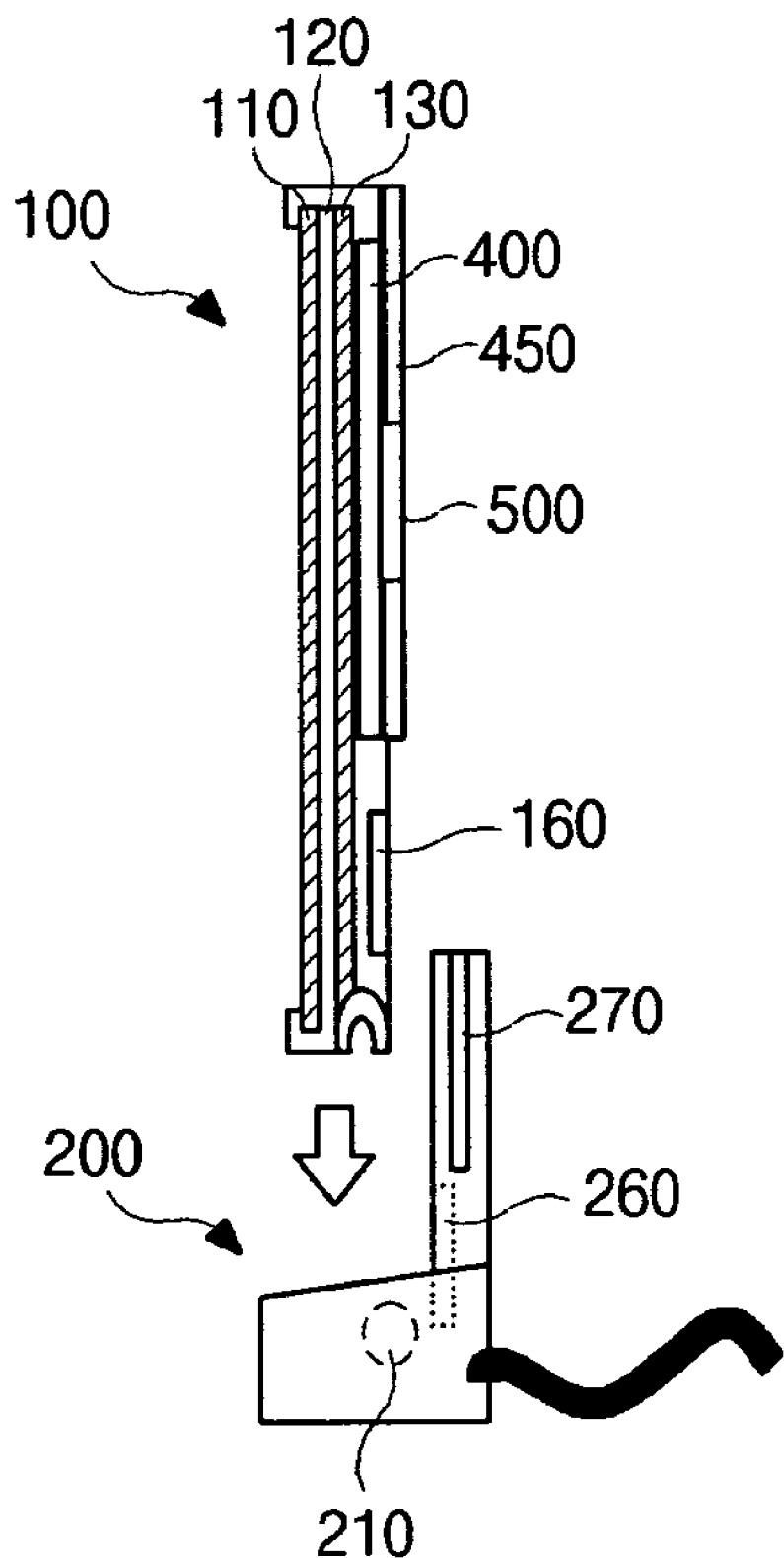
FIG. 6 is a side elevational view illustrating the liquid crystal module and the cradle of FIG. 5.

FIG. 6 is a side elevation view illustrating the liquid crystal module and the cradle of FIG. 5. The liquid crystal module 100 includes a liquid crystal panel 110, a functional optical sheet 120 provided on the liquid crystal panel 110, and a light guide plate 130 provided on the functional optical sheet 120. The liquid crystal module 100 further includes the battery 400 and the memory card 500 disposed in a rear portion of the light guide plate 130. The memory card 500 may be connected to a PCB (Printed Circuit Board) 450. The cradle 200 includes the lamp 210, the second connector 260 corresponding to the first interface connector 160 of the liquid crystal module 100, and the slide-protrusion 270.

The liquid crystal panel 110 may be classified into a transmissive type, a reflective type and a transflective type. The transmissive type has a light source, e.g., a backlight assembly, and receives light from the light source to the display images. The reflective type does not have a light source, but uses external light to save electrical power. The transflective type has a light source, but also uses the external light. Namely, the transflective type combines the best features of transmissive and reflective liquid crystal panels. Specifically, the transflective type panel is equally readable in both bright sunlight and low-light situations. The liquid crystal panel 110 of FIG. 6 is the transflective type, which receives the light emitted from the lamp 210 when the liquid crystal panel 100 is coupled with the cradle 200, and which also uses external light and battery power when the liquid crystal module 100 is detached from the cradle 200. Furthermore, when the liquid crystal panel 100 is coupled with the cradle 200, it may receive the image information from external devices through the cradle. However, when the liquid crystal panel 100 is detached from the cradle 200, it may receive and use the image information stored in the memory card 500.

Figure 7:
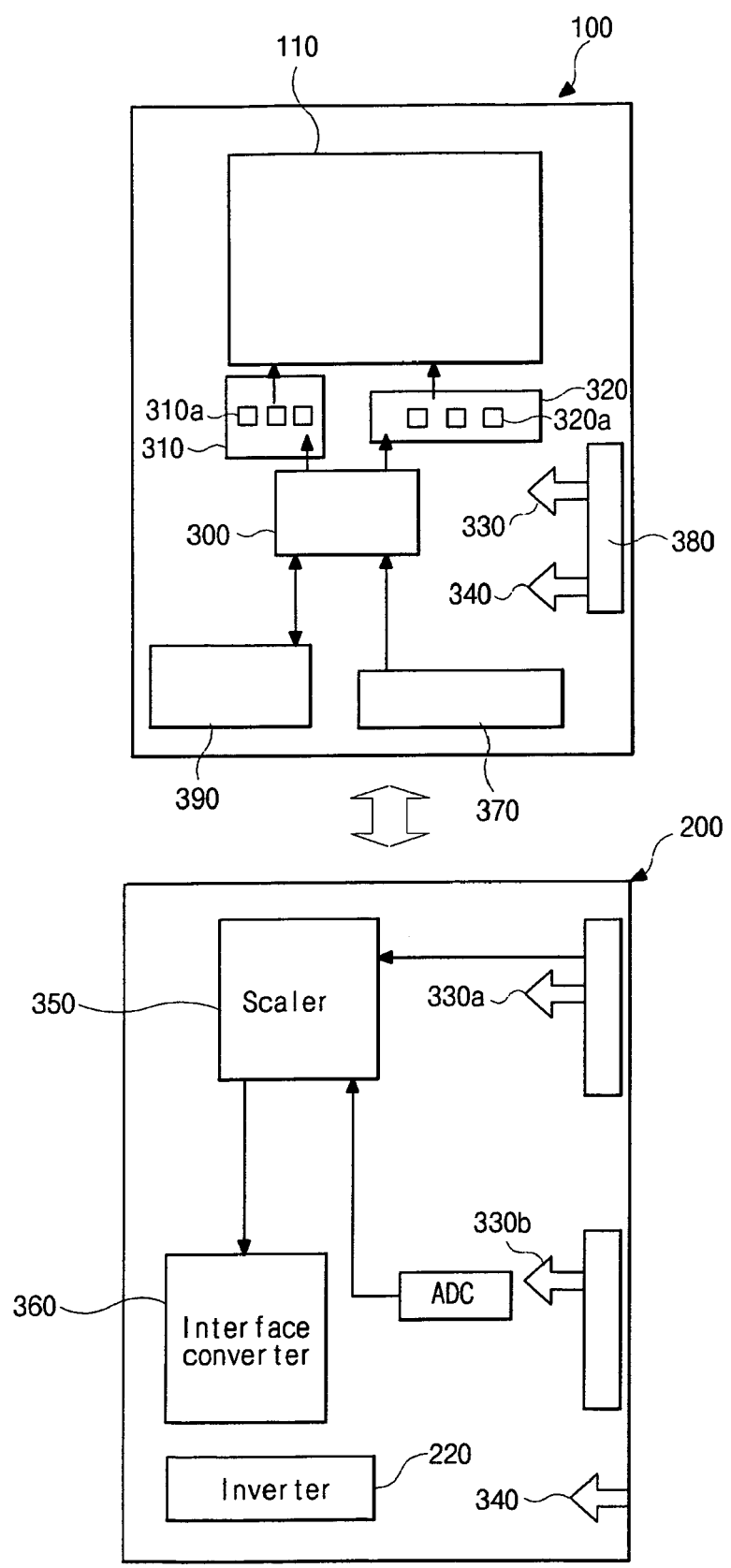
FIG. 7 is a block diagram illustrating the liquid crystal module and cradle of FIGS. 5 and 6.

FIG. 7 is a block diagram illustrating the liquid crystal module and cradle of FIGS. 5 and 6. A timing controller 300 is installed in the liquid crystal module 100. The timing controller 300 receives RGB data and control signals (e.g., inputting clerk, horizontal synchronous signals, vertical synchronous signals, and data enable signals) through an interface 380 (e.g., the first interface connector 160 of FIG. 6). Further, data drive ICs 310a and gate drive ICs 320a are also installed in the liquid crystal module 100. The data driver ICs 310a constitute a data driver 310, and the gate driver ICs 320a constitute a gate driver 320. Both the data driver 310 and the gate driver 320 are formed in the PCB (reference 450 of FIG. 6). The timing controller 300 generates control signals for driving the data and gate drivers 310 and 320.

When the liquid crystal module 100 is coupled with the cradle 200, power 340 and RCB control signals 330 are applied to the liquid crystal panel 110. However, when the liquid crystal module 100 is detached from the cradle 200, the power is supplied from the battery (reference 400 of FIG. 6), and the timing controller 300 receives image data from a memory interface 390. Additionally, the liquid crystal module 100 has a key input 370 which functions to capture displayed images and/or to change the displayed images. The key input 370 is able to control the timing controller 300 in order to selectively display internal image data stored in the memory card (reference 500 of FIG. 6) or external image data applied through the cradle 200.

Additionally in FIG. 7, an inverter 220 for the lamp (reference 210 of FIG. 6) is installed in the cradle 200. Also, the cradle 200 includes a scaler 350 for receiving digital control signals 330a and analogue control signals 330b and converts the digital and analogue control signals 330a and 330b into image/control signals. The image/control signals generated in the scaler 350 are then supplied to the liquid crystal module 100 though an interface converter 360 (e.g., the second interface connector 260 of FIG. 6).

Figure 8:
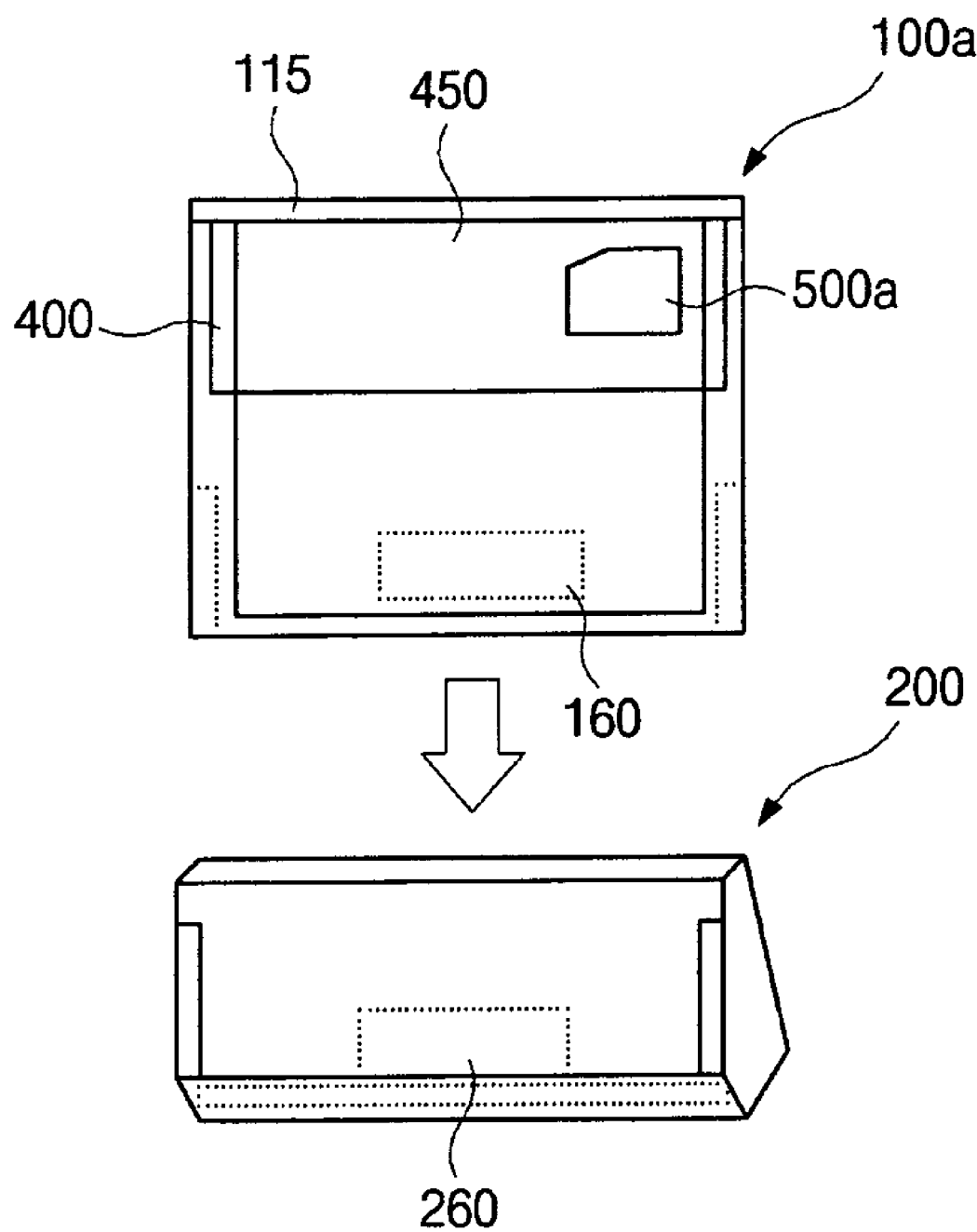
FIG. 8 is a front elevation view illustrating another coupling of the liquid crystal module with a cradle.

FIG. 8 is a front elevation view illustrating another liquid crystal module coupling a cradle. A liquid crystal module 100a of FIG. 8 is similar to that of FIG. 5, but a memory card 500a is integrally embedded in a source PCB 450. The embedded memory card 500a receives captured image files and other data files from the cradle 200 and stores them, whereby the liquid crystal module 100a uses the embedded memory card 500a when it is in portable use by being detached from the cradle 200. The block diagram of the liquid crystal module 100a of FIG. 8 is the same as that shown in FIG. 7.

Figure 9:
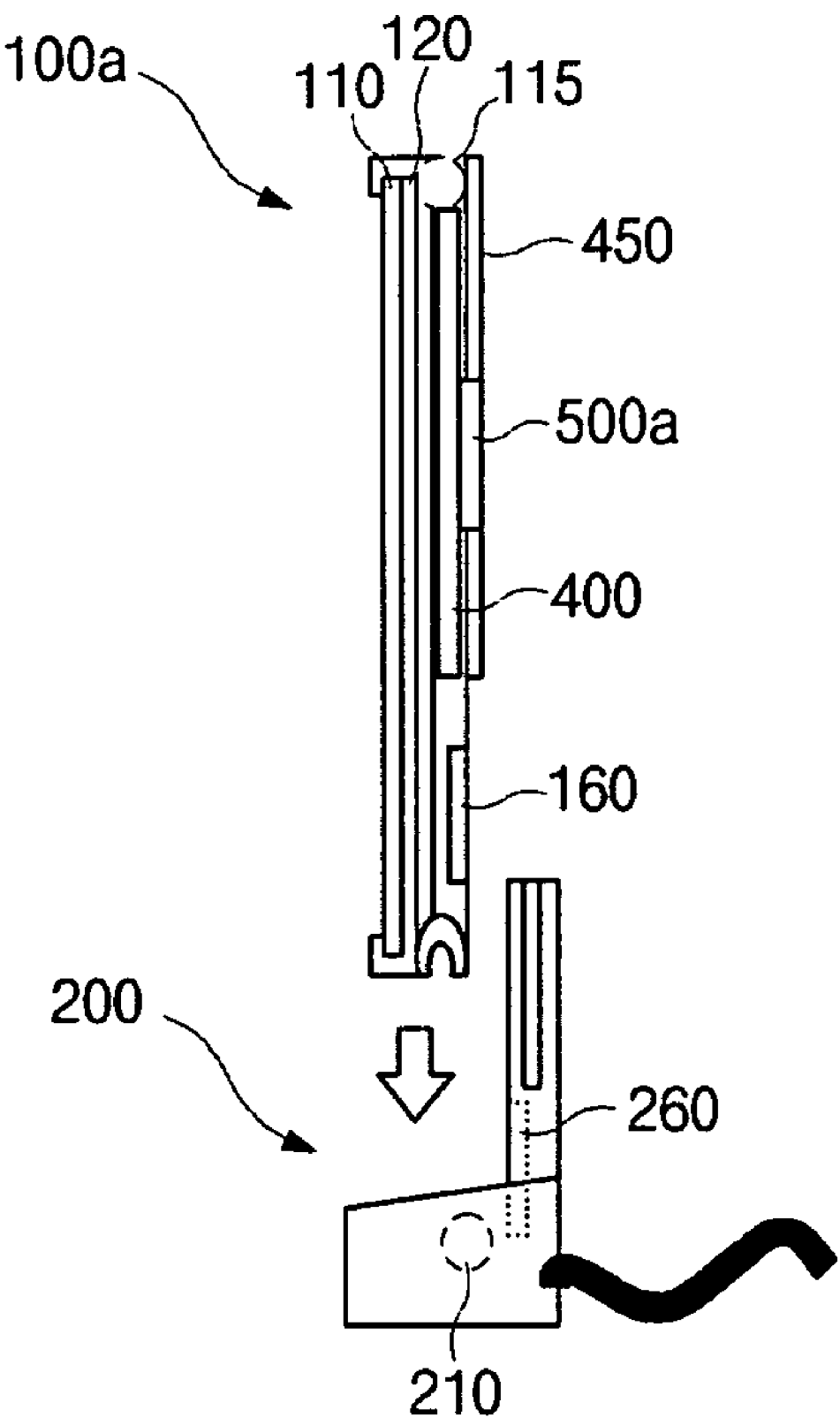
FIG. 9 is a side elevational view illustrating the liquid crystal module and the cradle of FIG. 8.

FIG. 9 is a side elevation view illustrating the liquid crystal module and the cradle of FIG. 8. In FIG. 9, the liquid crystal module 100a includes an additional lamp 115 although the standard lamp 210 is present in the cradle 200. The additional lamp 115 is used when the liquid crystal panel 110 is of the transmissive type and whenever the liquid crystal module 100a is detached from the cradle 200.

According to the present invention, since the liquid crystal panel includes a memory card, the liquid crystal panel can be portable and display images at any time and in any place. When the above-mentioned liquid crystal panel is coupled with the cradle, it can receive various image data from TV, video, digital camera and computer, and capture and store the displayed images in the memory card installed in the liquid crystal module.

Figure 10:
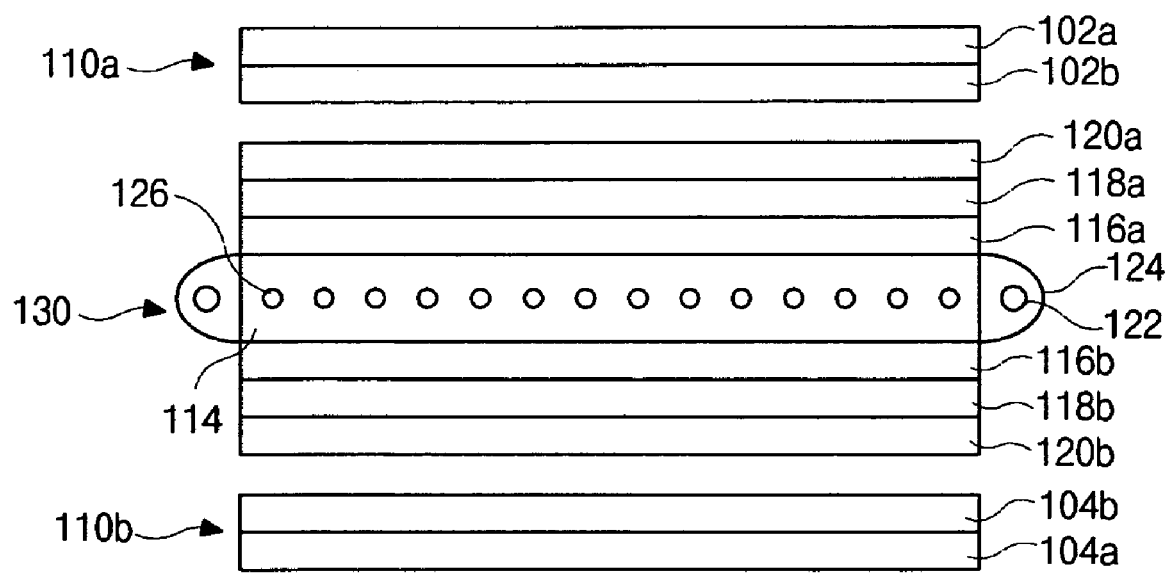
FIG. 10 is a cross sectional view conceptually illustrating a detachable liquid crystal module for a double-sided display.
Figure 11:
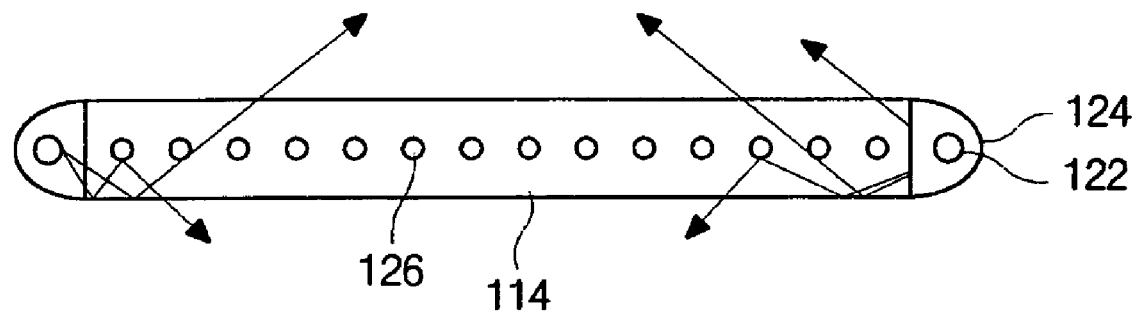
FIG. 11 conceptually illustrates light passing through the light guide plate of FIG. 10.

FIG. 10 is a cross sectional view conceptually illustrating a detachable liquid crystal module for a double-sided display. In FIG. 11, the double-sided liquid crystal module includes first and second liquid crystal panels 110a and 110b and a backlight assembly 130 disposed between the first and second liquid crystal panels 110a and 110b. The first liquid crystal panel 110a includes a first upper substrate 102a, a first lower substrate 102b, and a liquid crystal layer (not shown) between the first upper and lower substrate 102a and 102b. The second liquid crystal panel 110b includes a second upper substrate 104a, a second lower substrate 104b, and a liquid crystal layer (not shown) between the second upper and lower substrate 104a and 104b. Although not shown in FIG. 10, a plurality of spacers are interposed in order to form a gap between the first upper and lower substrates 102a and 102b and between the second upper and lower substrates 104a and 104b. Further, the first and second upper substrates 102a and 104a include color filters, common electrodes and black matrixes, and the first and second lower substrates 102b and 104b include data lines, gate lines, and thin film transistors (TFTs). The first and second lower substrates 102b and 104b also include pad areas in peripheries, where gate and data drivers are formed to supply scan signals and data signals to the gate and data lines, respectively. First and second upper polarizers (not shown) are disposed on front surfaces of the first and second liquid crystal panels 110a and 110b, respectively. Additionally, first and second lower polarizers (not shown) are formed on rear surfaces of the first and second liquid crystal panels 110a and 110b, respectively.

The backlight assembly 130 includes lamps 122, a lamp housing 124 surrounding the lamps 122, a light guide plate 114 directing light toward the first and second liquid crystal panels 110a and 110b, a plurality of first optical sheets 116a, 118a and 120a provided between the light guide plate 114 and the first liquid crystal panel 110a, and a plurality of second optical sheets 116b, 118b and 120b provided between the light guide plate 114 and the second liquid crystal panel 110b. Each of the lamps 122 may be a cold cathode fluorescent (CCF) lamp, and the lamps 122 may be disposed on both sides of the light guide plate 114. The light emitted from the lamps 122 is incident to the side of light guide plate 114, and then is directed toward the upper and lower directions. Each of the lamp housings 124 has a reflective inner surface, and surrounds each of the lamps 122, whereby the lamp housings 124 reflect the light emitted from the lamps 122 toward the light guide plate 114. The light emitted from the lamps 122 is linear light, but converted into surface light by the light guide plate 114 for uniformly irradiating the upper and lower liquid crystal panels 110a and 110b.

FIG. 11 conceptually illustrates the light passing through the light guide plate of FIG. 10. The light guide plate 114 has a plurality of micro patterns 126 that are formed by a laser process. Each of the micro patterns 126 has circular, oval, polygonal, or stripy shape. As shown in FIG. 11, the micro patterns 126 disperse the incident light in the upper and lower directions so as to uniformly irradiate the upper and lower liquid crystal panels 110a and 110b.

Referring back to FIG. 10, the first optical sheets 116a, 118a and 120a disposed between the light guide plate 114 and the first liquid crystal panel 110a raise the efficiency of light released from the light guide plate 114. The first optical sheets may comprise a first diffusing sheet 116a for diffusing the light all over the area, and first upper and lower prism sheets 118a and 120a for making the incidence light perpendicular to the first liquid crystal panel 110a. Similar to the first optical sheets, the second optical sheets also raise the light efficiency, and comprises a second diffusing sheet 116b for diffusing the light, and second upper and lower prism sheets 118b and 120b for making the incidence light perpendicular to the second liquid crystal panel 110b.

According to the embodiment shown in FIGS. 10 and 11, since the double-sided liquid crystal module has the light guide plate 114 having the various-shaped micro patterns 126 therein, the light emitted from the lamps 122 can be released uniformly in the upper and lower directions. Further, the embodiment shown in FIGS. 10 and 11 does not require the reflector that was adjacent to the light guide plate in the related art.

Figure 12:
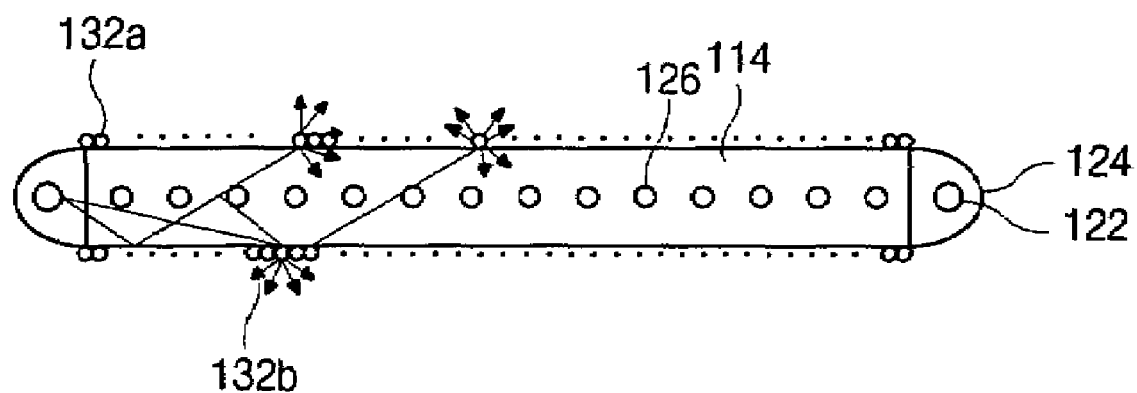
FIG. 12 shows dummy patterns disposed in the light guide plate of FIG. 10.

FIG. 12 shows dummy patterns disposed on the light guide plate of FIG. 10. In FIG. 12, a plurality of first dummy patterns 132a are disposed on a front surface of the light guide plate 114, and a plurality of second dummy patterns 132b are disposed on a rear surface of the light guide plate 114. The first and second dummy patterns 132a and 132b act to reflect and diffract the light released from the light guide plate 114. The first and second dummy patterns 132a and 132b may reduce the number of the first and second optical sheets.

The double-sided liquid crystal module described with reference to FIGS. 10-12 may be coupled with the cradle, like FIGS. 5 and 6. Namely, the double-sides liquid crystal module may have slide-grooves, and may be inserted into the cradle that has the lamp and connectors. Further, the double-sided liquid crystal module may include the battery and memory card.

Figure 13A:
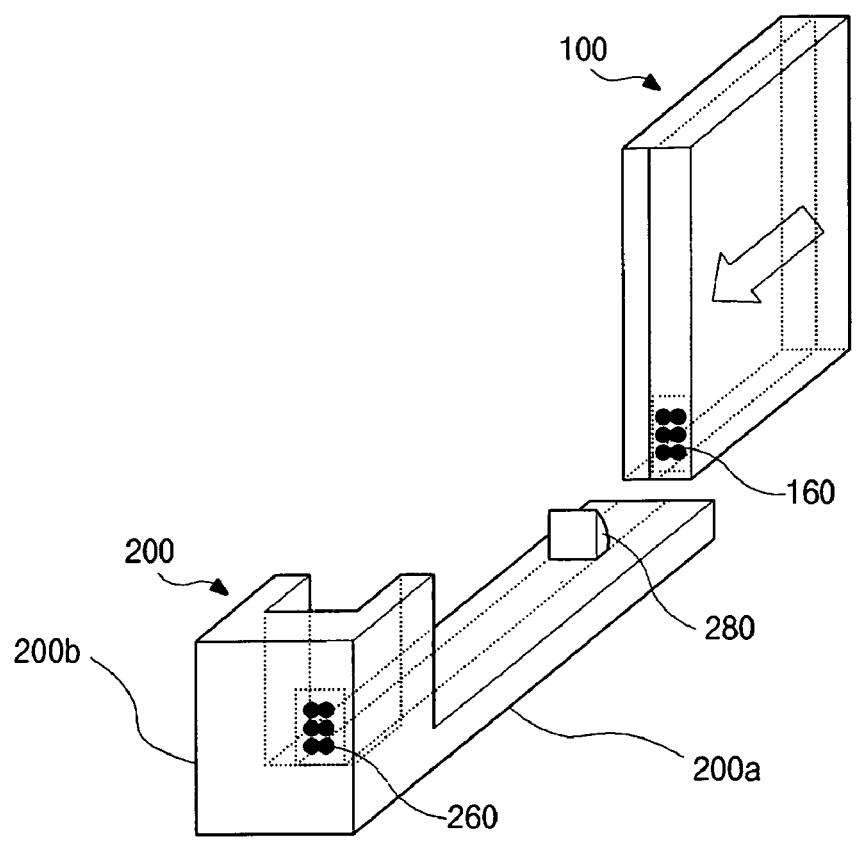
FIGS. 13A and 13B illustrate another example of the coupling a liquid crystal module with a cradle.
Figure 13B:
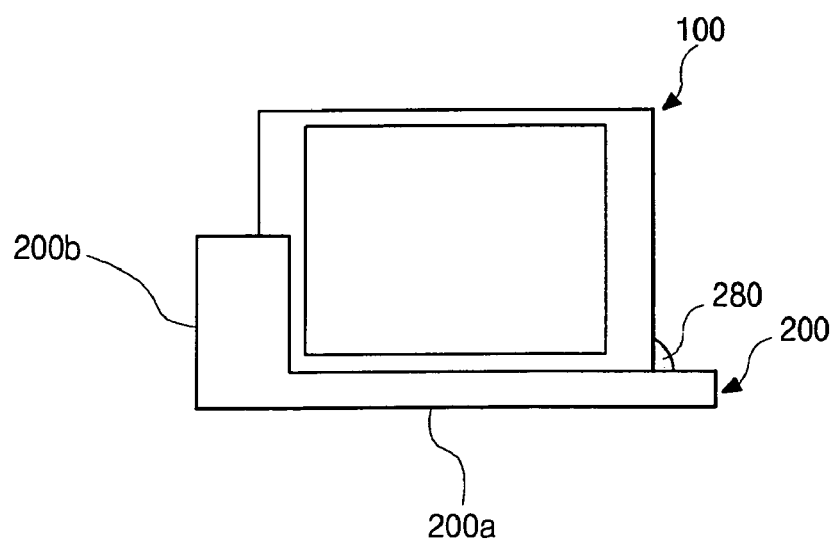

FIGS. 13A and 13B illustrate another example of coupling a liquid crystal module with a cradle. In FIGS. 13A and 13B, a liquid crystal module 100 may be the double-sided liquid crystal module previously described with reference to FIGS. 10-12. A first interface connector 160 is formed on a bottom side portion of the liquid crystal module 100. Unlike the cradle of FIGS. 5 and 6, the cradle 200 of FIGS. 13A and 13B has an "L" shaped configuration and comprises a bottom portion 200a and a side portion 200b. The bottom portion 200a has a lock 280 that is raised upward from the surface of the bottom portion 200a. The lock 280 includes a spring (not shown) therein, such that it can be compressed by the application of pressure. The side portion 200b rises from the bottom portion 200a and has a slot or indentation having a width substantially the same as the width of the liquid crystal module 100. Furthermore, a second interface connector 260 is formed in the cradle 200 and corresponds to the first interface connector 160. When the liquid crystal module 100 is coupled with the cradle 200, the liquid crystal module 100 slides along the bottom portion 200a, and is inserted into the indentation of the side portion 200b, thereby locking the liquid crystal module 100 using the lock 280, as shown in FIG. 13B. Further, the first interface connector 160 contacts the second interface connector 260 when the liquid crystal module 100 is coupled with the cradle 200. Additionally, when the liquid crystal module 100 is detached from the cradle 200, the liquid crystal module 100 slides out along the side portion 200b.

Figure 14:
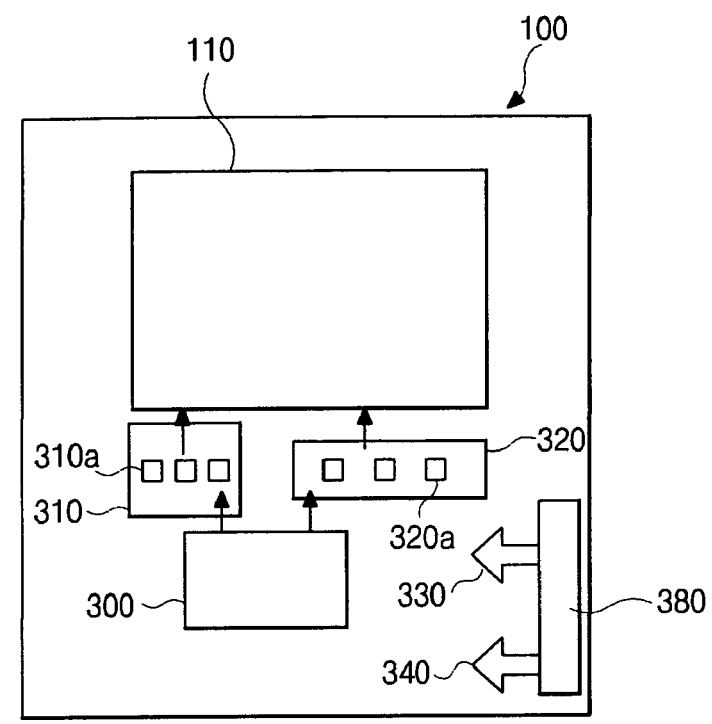
FIG. 14 is a block diagram illustrating the liquid crystal module of FIG. 10 and the cradle of FIGS. 13A and 13B.
Figure 14:
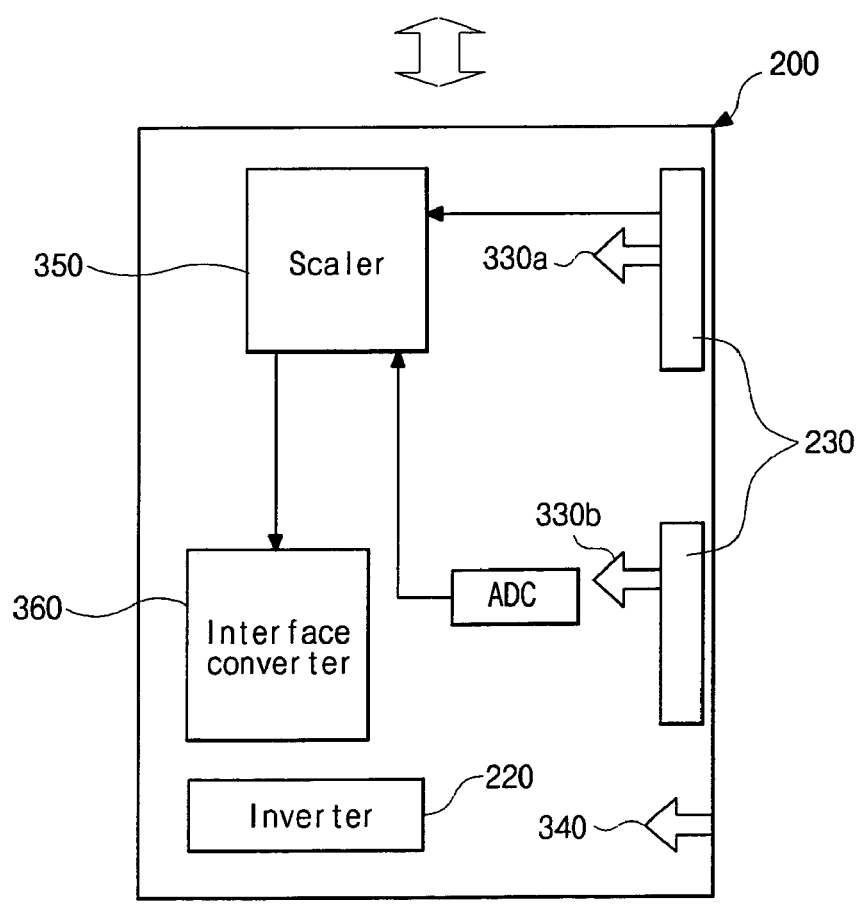

FIG. 14 is a block diagram illustrating the liquid crystal module of FIG. 10 and the cradle of FIGS. 13A and 13B. FIG. 14 is similar to FIG. 7, with some variations.

In FIG. 14, a timing controller 300 is installed in the double-sided liquid crystal module 100. The timing controller 300 receives RGB data and control signals (e.g., inputting clerk, horizontal synchronous signals, vertical synchronous signals, and data enable signals) through an interface 380 (e.g., the first interface connector 160 of FIG. 13A). Further, data drive ICs 310a and gate drive ICs 320a are also provided in the liquid crystal module 100. The data driver ICs 310a constitute a data driver 310, and the gate driver ICs 320a constitute a gate driver 320. Both the data driver 310 and the gate driver 320 are formed in the PCB (e.g., reference 450 of FIG. 6). The timing controller 300 generates control signals for driving the data and gate drivers 310 and 320.

When the double-sided liquid crystal module 100 is coupled with the cradle 200, power 340 and RCB control signals 330 are applied to the double-sided liquid crystal panel 110. However, when the double-sided liquid crystal module 100 is detached from the cradle 200, power is applied from the battery (e.g., reference 400 of FIG. 6). Unlike the liquid crystal module of FIG. 7, the double-sided liquid crystal module 100 of FIG. 14 generally does not include the memory interface and the key input. However, it can also include them.

Additionally in FIG. 14, an inverter 220 for the lamps is installed in the cradle 200. Also, the cradle 200 includes a scaler 350 that receives digital control signals 330a and analogue control signals 330b and converts the digital and analogue control signals 330a and 330b into image/control signals. The image/control signals generated in the scaler 350 are then supplied to the liquid crystal module 100 though an interface converter 360 (e.g., the second interface connector 260 of FIG. 13A).

According to the embodiment described with reference to FIGS. 10-14, the double-sided liquid crystal display device, which displays images on both sides thereof, is provided.

Figure 15A:
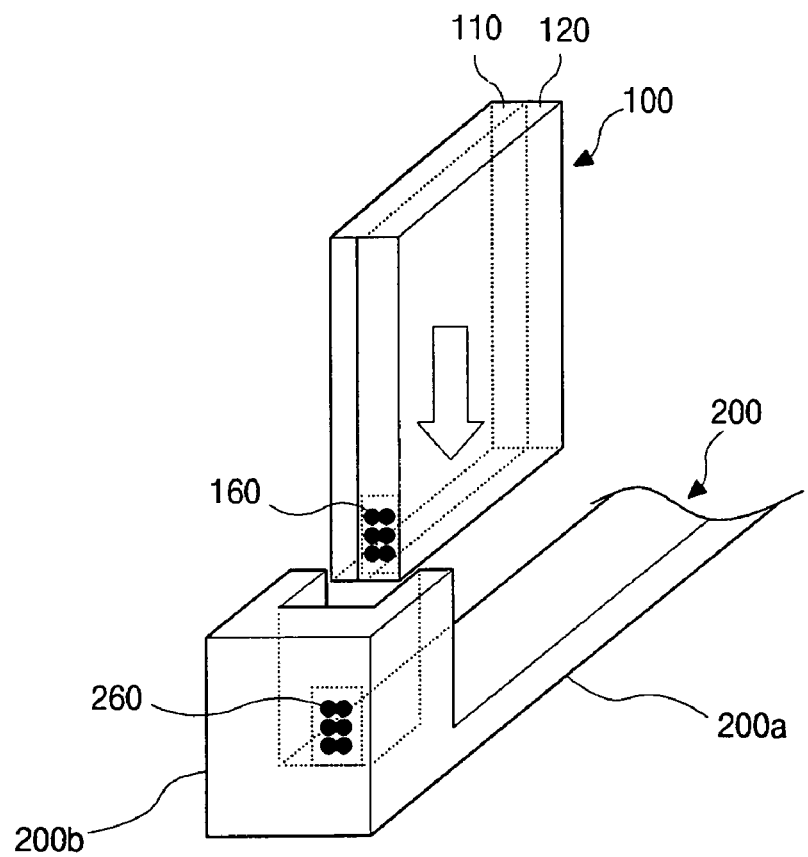
FIGS. 15A and 15B illustrate another example of the coupling a liquid crystal module with a cradle.
Figure 15B:
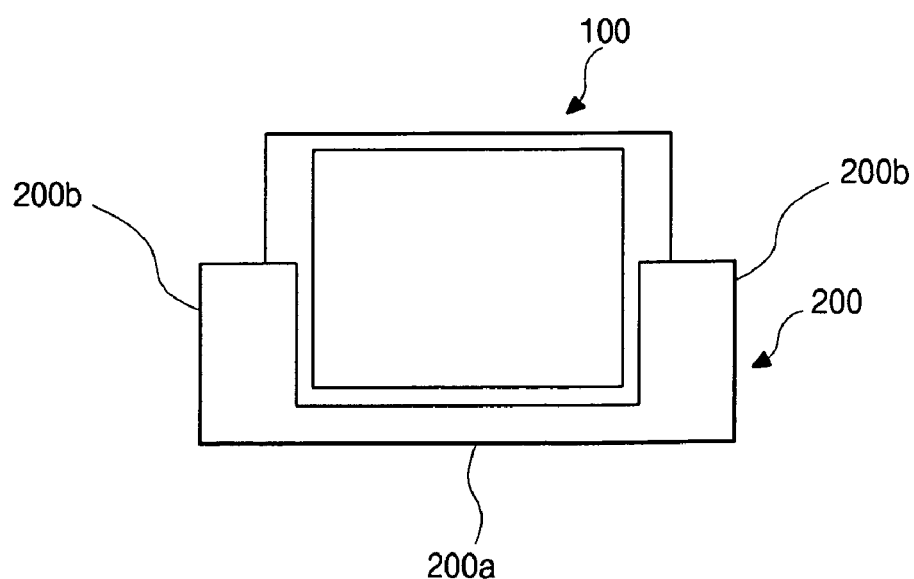

FIGS. 15A and 15B illustrate another example of coupling a liquid crystal module with a cradle. In FIGS. 15A and 15B, a liquid crystal module 100 may be the double-sided liquid crystal module previously described with reference to FIGS. 10-12. A first interface connector 160 is formed on a bottom-side portion of the liquid crystal module 100. Unlike the cradle of FIGS. 13A and 13B, a cradle 200 of FIGS. 15A and 15B has a "U" shaped configuration and comprises a bottom portion 200a and two side portions 200b that are raised from the bottom portion 200a. Each of the side portions 200b has an indentation with the same width as the liquid crystal module 100. Further, a second interface connector 260 is formed in the indentation of one of the side portions 200b and corresponds to the first interface connector 160. When the liquid crystal module 100 is coupled with the cradle 200, the liquid crystal module 100 slides along the indentations of the side portions 200b to the bottom portion 200a until the first interface connector 160 meets the second interface connector 260, as shown in FIGS. 15A and l5B. Additionally, when the liquid crystal module 100 is detached from the cradle 200, the liquid crystal module 100 slides out of the cradle 200 alongside the side portions 200b. Although not shown in FIGS. 15A and 15B, the cradle 200 may include a lamp, and the first interface connector 160 may be a spring-type connector.

Figure 16A:
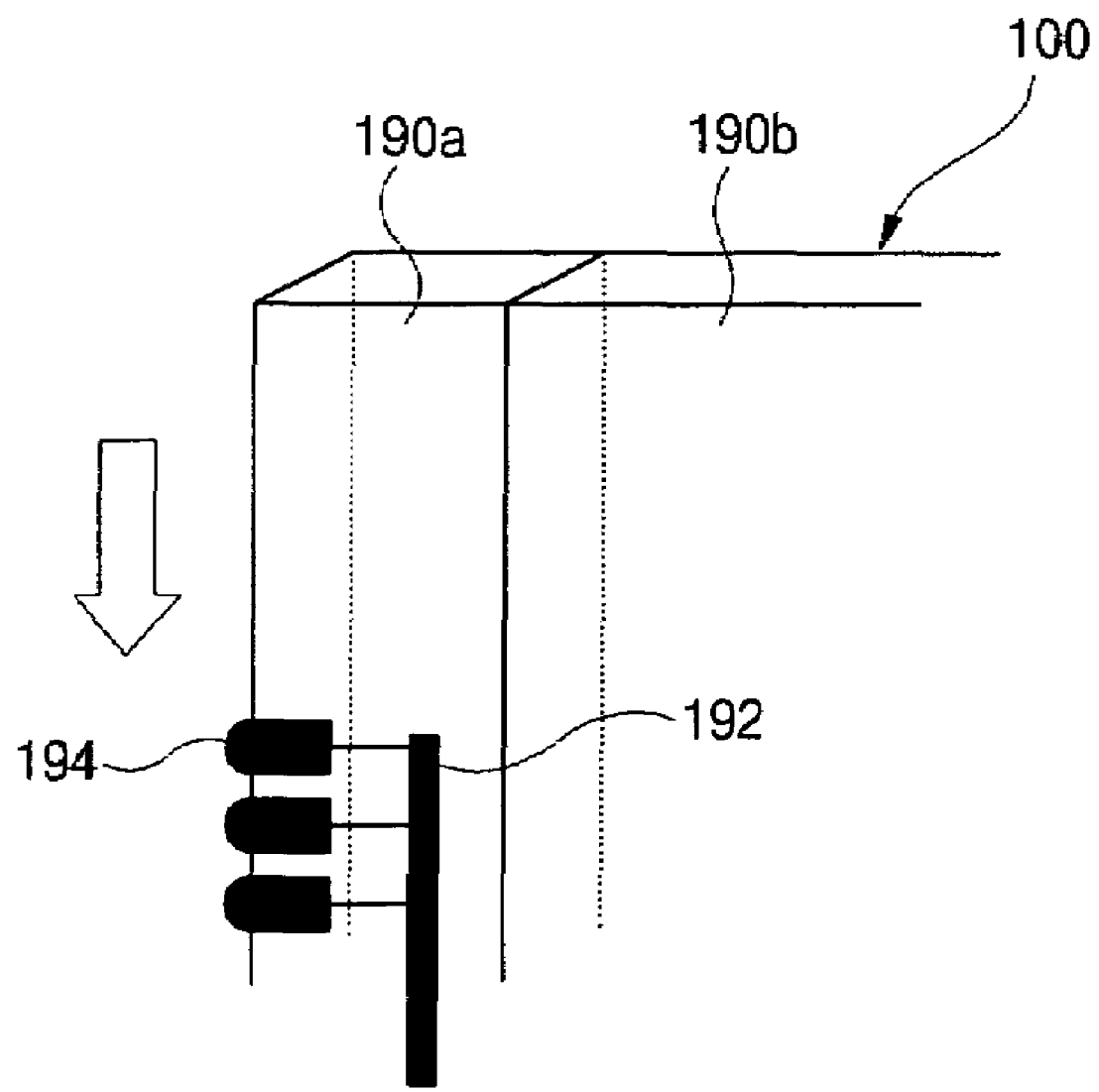
FIG. 16A illustrates a portion of a liquid crystal module in which spring type connectors are installed.
Figure 16B:
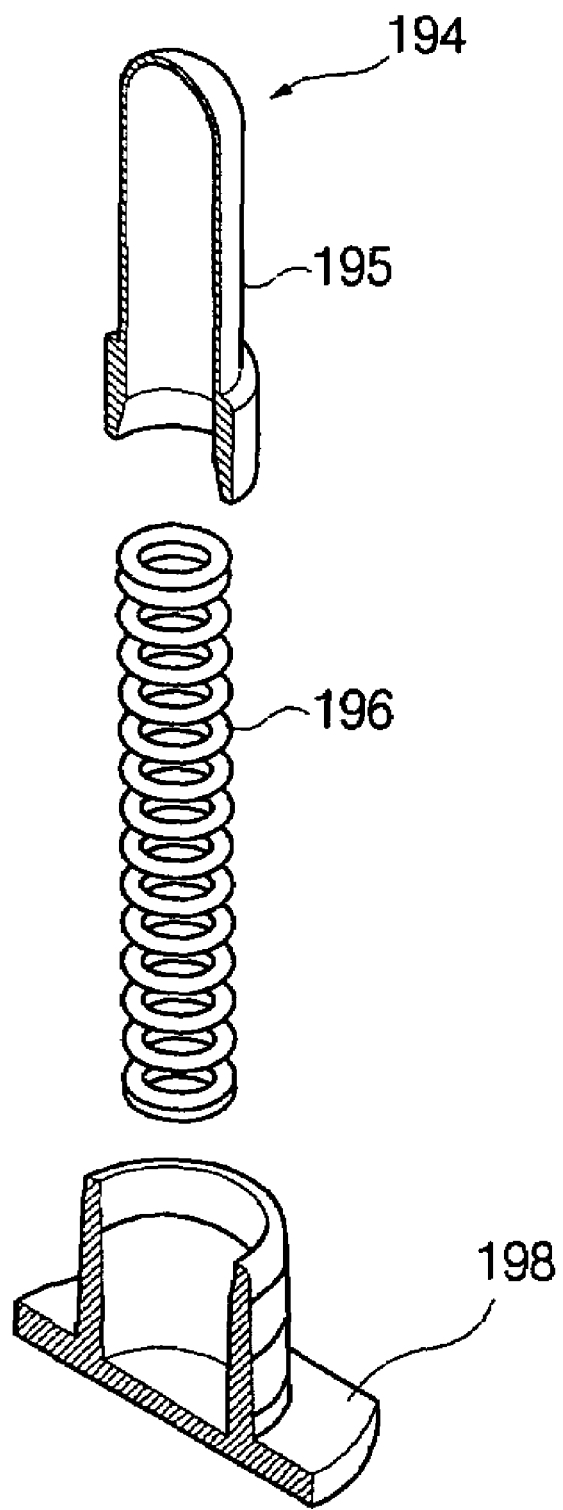
FIG. 16B is a perspective view illustrating the spring type connector.

FIG. 16A illustrates a portion of a liquid crystal module wherein the spring-type connectors are installed. FIG. 16B is a perspective view illustrating the spring type connector.

In FIG. 16A, the liquid crystal module 100 may be divided into a dummy area 190a and a display area 190b. The dummy area 190a is the peripheral portion of the liquid crystal module 100 and does not display any image, while the display area 190b displays images using liquid crystal modulation. In the dummy area 190a, a signal/power line 192 is installed, and a plurality of spring connectors 194 are formed and connected to the signal/power line 192. The spring connectors 194 are protruded from the inside of the dummy area 190a to the outside, and may be pushed into the inside by the pressure of the spring system.

As shown in FIG. 16B, the spring connector 194 is consisting of a terminal 195, a coil spring 196 and a terminal base 198. The terminal 195 is hollow and has a bullet shape so that the coil spring 196 can be inserted into the terminal 195. The terminal base 198 is also hollow for accommodating the coil spring 196 and is coupled with the terminal 195. The terminal base 198 is connected to the signal/power line 192 of FIG. 16A. The front end of the terminal 195 is rounded and is adapted to contact the second interface connector 260 (in FIG. 15A) when the liquid crystal module 100 is coupled with the cradle 200. Since the spring connector 194 has the spring system, as shown in FIG. 16B, the spring connector 194 can be tightly connected to the second interface connector 260 because of the coil spring 196 which pushes the terminal 194.

Figure 17:
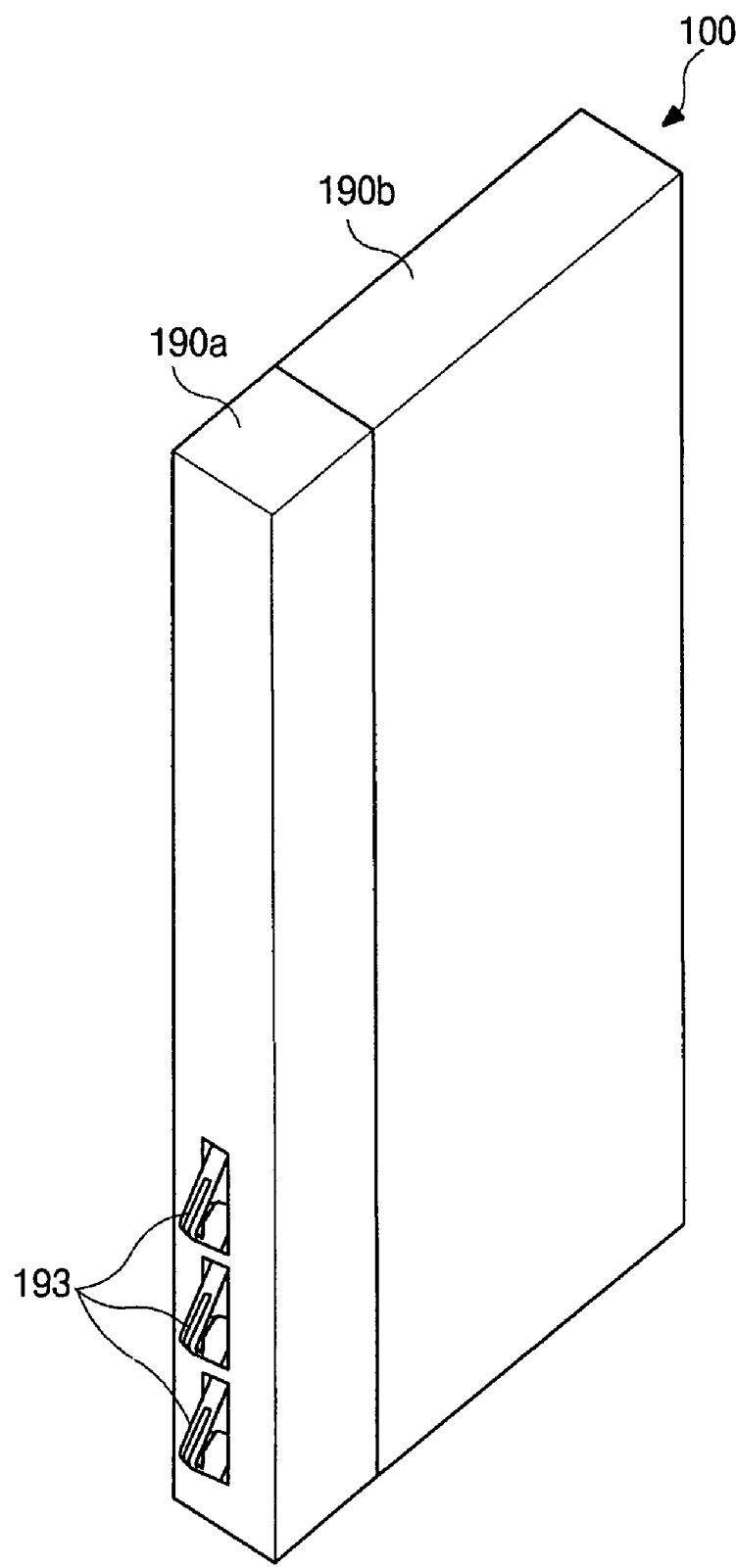
FIG. 17 is a perspective view of a liquid crystal module that has another spring system in the connectors.

FIG. 17 is a perspective view of a liquid crystal module that has another spring system in the connectors. In FIG. 17, a liquid crystal panel 100 is divided in a dummy area 190a and a display area 190b. Unlike the spring system shown in FIGS. 16A-16B, the liquid crystal panel 100 has leaf-spring type connectors 193 each of which has a leaf spring rather than a coil spring. The leaf-spring type connectors 193 may be pressed into the dummy area 190a by the application of pressure.

Figure 18:
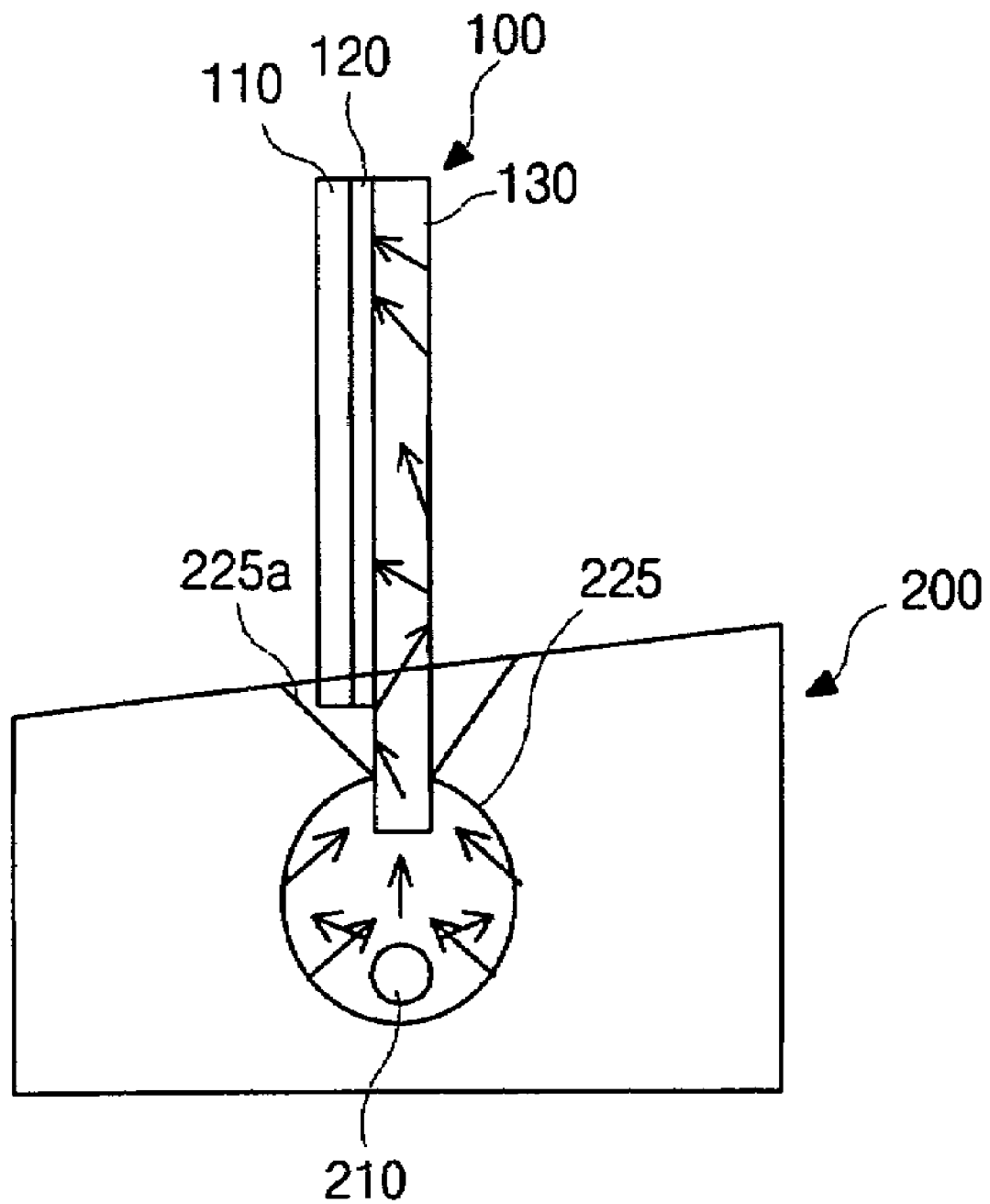
FIG. 18 is a diagram schematically illustrating the functional relationship between the liquid crystal module and a cradle.

FIG. 18 is a diagram schematically illustrating the functional relation between the liquid crystal module and the cradle. In FIG. 18, a lamp 210 is installed inside the cradle 200, and a reflective lamp housing 225 is also installed in the cradle 200 around the lamp 200. The reflective lamp housing 225 reflects light emitted from the lamp 210, and then directs the emitted light to a light guide plate 130 of the liquid crystal module 100. A reflective material may be coated on the inner surface of the reflective lamp housing 225. Since the reflective lamp housing 225 is provided in the cradle 200, the light efficiency increases and thus some of optical sheets 120 can be omitted. Further, it is possible to enlarge the size of the lamp 210.

Additionally in FIG. 18, a portion 225a of the cradle 200, where the liquid crystal module 100 is connected, has the sectional shape of a funnel. At this portion, the light guide plate 130 further extends into the reflective lamp housing 225. Thus, the light guide plate 130 is only put into an opening of the reflective lamp housing among elements of the liquid crystal module, such that the light reflected by the reflective lamp housing 225 is only transmitted to the light guide plate 130, and not to the liquid crystal panel 110. Although only one lamp 210 is shown in FIG. 18, the number of lamps is not limited.

Figure 19:
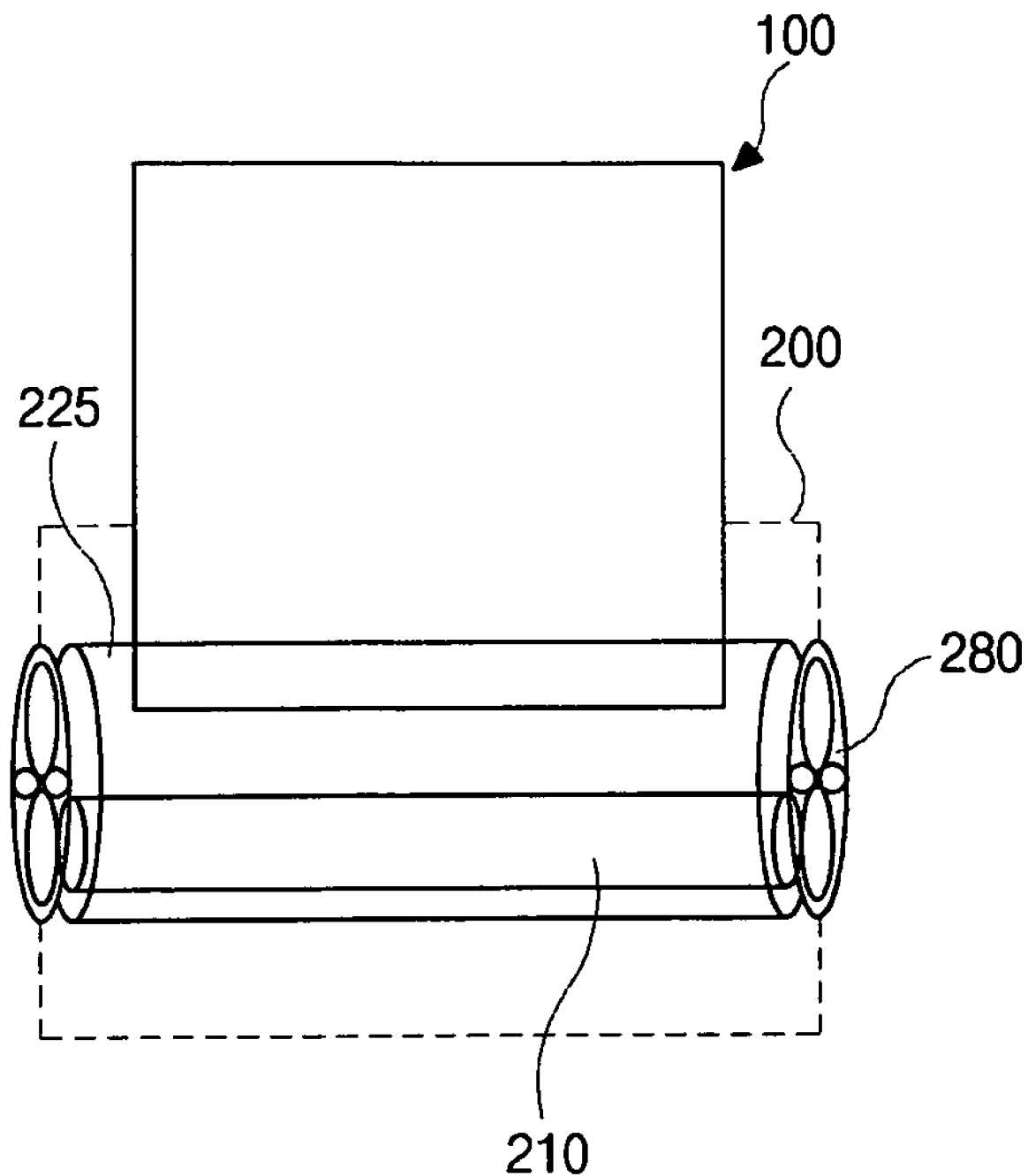
FIG. 19 is a front view schematically illustrating a liquid crystal display device having a cooling system.

FIG. 19 is a front view schematically illustrating a liquid crystal display device having a cooling system. In FIG. 19, the liquid crystal module 100 and the cradle 200 are the same as those shown in FIG. 18, but the cradle 200 has coolers 280 on both sides of the reflective lamp housing 225. The coolers 280 may include cooling fans, and may be turned on at the time when the liquid crystal module 100 is coupled with the cradle 200 or when the lamp (reference 210 of FIG. 18) is turned on. Moreover, the coolers 280 may be operable for a predetermined time, or whenever the inner temperature of the reflective lamp housing 225 reaches a predetermined value. If the coolers 280 include the cooling fans, the coolers 280 need electric motors.

Figure 20A:
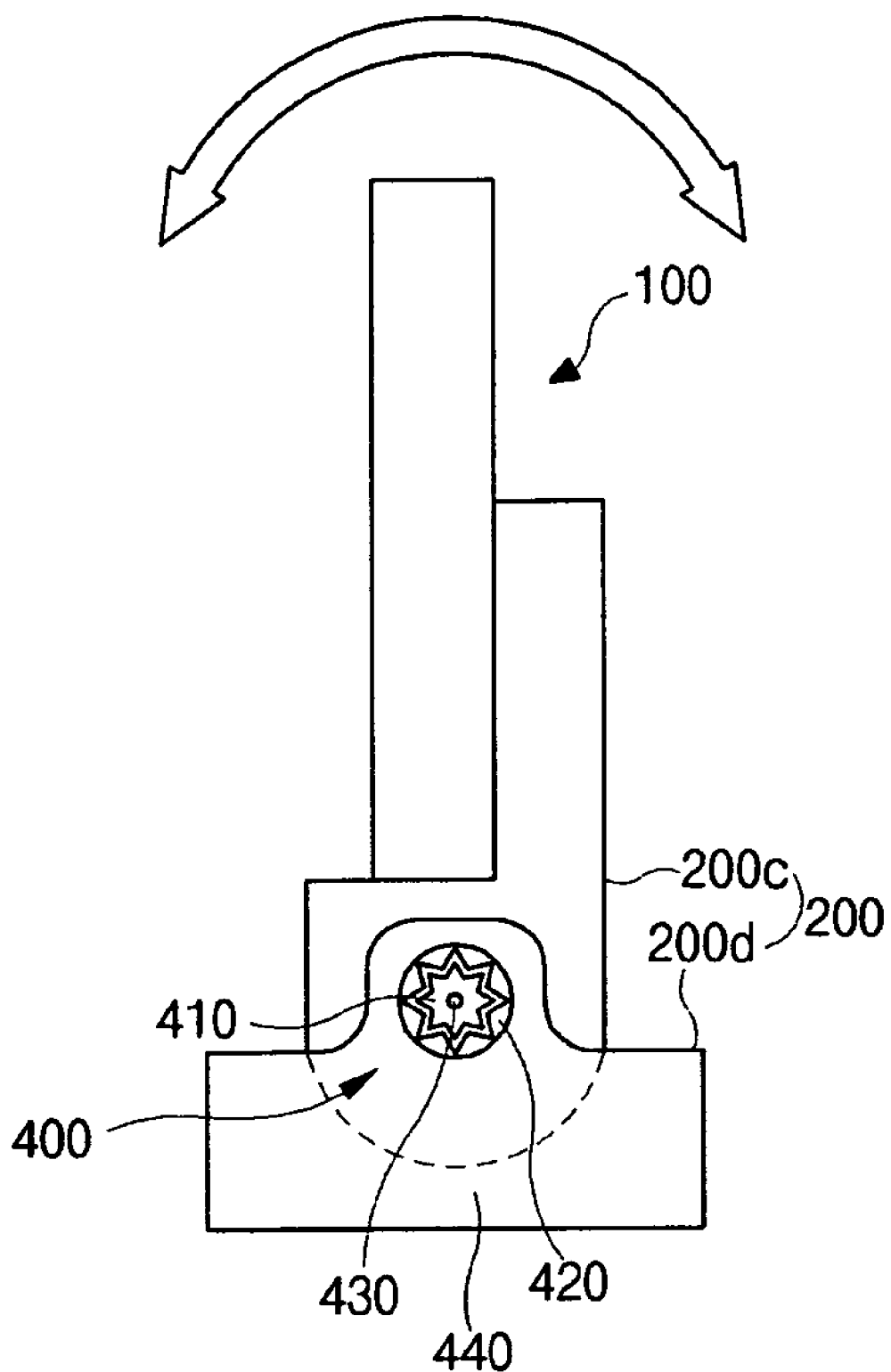
FIG. 20A is a side elevational view schematically illustrating a liquid crystal display device having an adjustable system for a liquid crystal module.
Figure 20B:
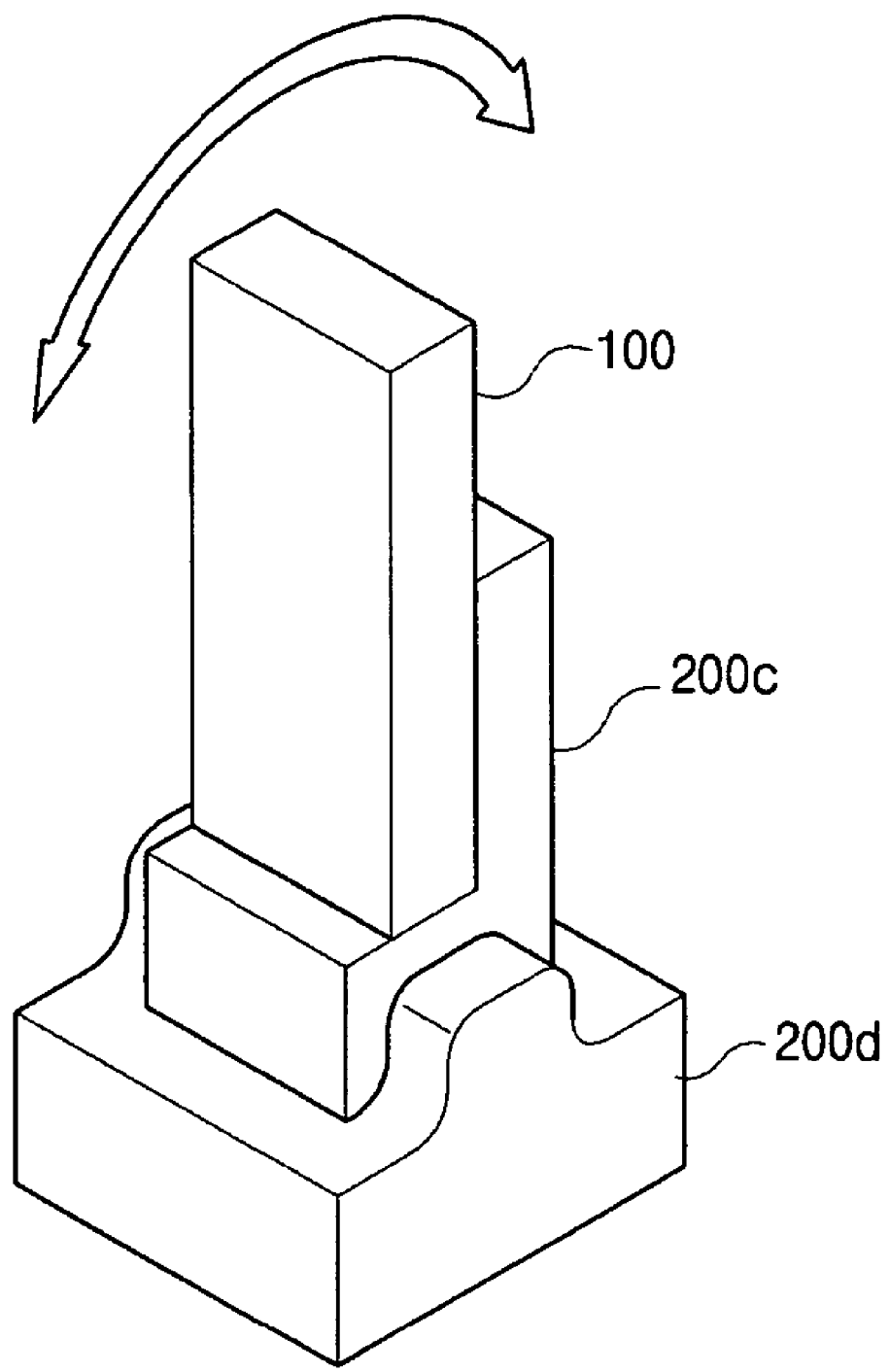
FIG. 20B is a perspective view of FIG. 20A.

FIG. 20A is a side elevation view schematically illustrating a liquid crystal display device having an adjustable system for a liquid crystal module. FIG. 20B is a perspective view of FIG. 20A.

In FIGS. 20A and 20B, the cradle 200 is divided into a module mount 200c and a main body 200d which are connected to each other by an adjustable system 400. The liquid crystal module 100 is mounted on the module mount 200c. The adjustable system 400 may be installed on a side of the main body 200d, connected to the module mount 200c. The adjustable system 400 may includes an adjuster 410 having a saw-tooth tooth configuration, and a holder 420 surrounding the adjuster 410 and having an inner surface corresponding to the saw-tooth configuration of the adjuster 410. The adjuster 410 is made of a rubbery material, for example, and extends out from the main body 200b so as to move the module mount 200c in forward and backward directions. The holder 420 may integrally be joined with the main body 200d. After adjusting the angle of the module mount 200c, the adjuster 410 is pushed into the holder 420 so that the saw-tooth of the adjuster 410 matches with the saw-tooth inner surface of the holder 420, whereby the position of the module mount 200c as well as the angle of the liquid crystal module 100 can be adjusted. An axis 430 is installed in a center of the adjuster 400, and the axis 430 is also fixed to the module mount 200c to transmit the adjuster's movement to the module mount 200c. Another adjuster 410 and holder 420 may be installed in the other side of the main body 200d. Further, the main body 200d has a space 440 therein to provide for the free movement of a bottom of the module mount 200c. The module mount 200c may include a lamp (reference 210 of FIG. 18) and an interface connector (reference 260 of FIG. 15A) so as to supply light and electrically communicate with the liquid crystal module 100, but a connector (reference 230 of FIG. 3) for receiving image data from the outside and an inverter (reference 220 of FIG. 7) are not required in the module mount 200c.

Figure 21:
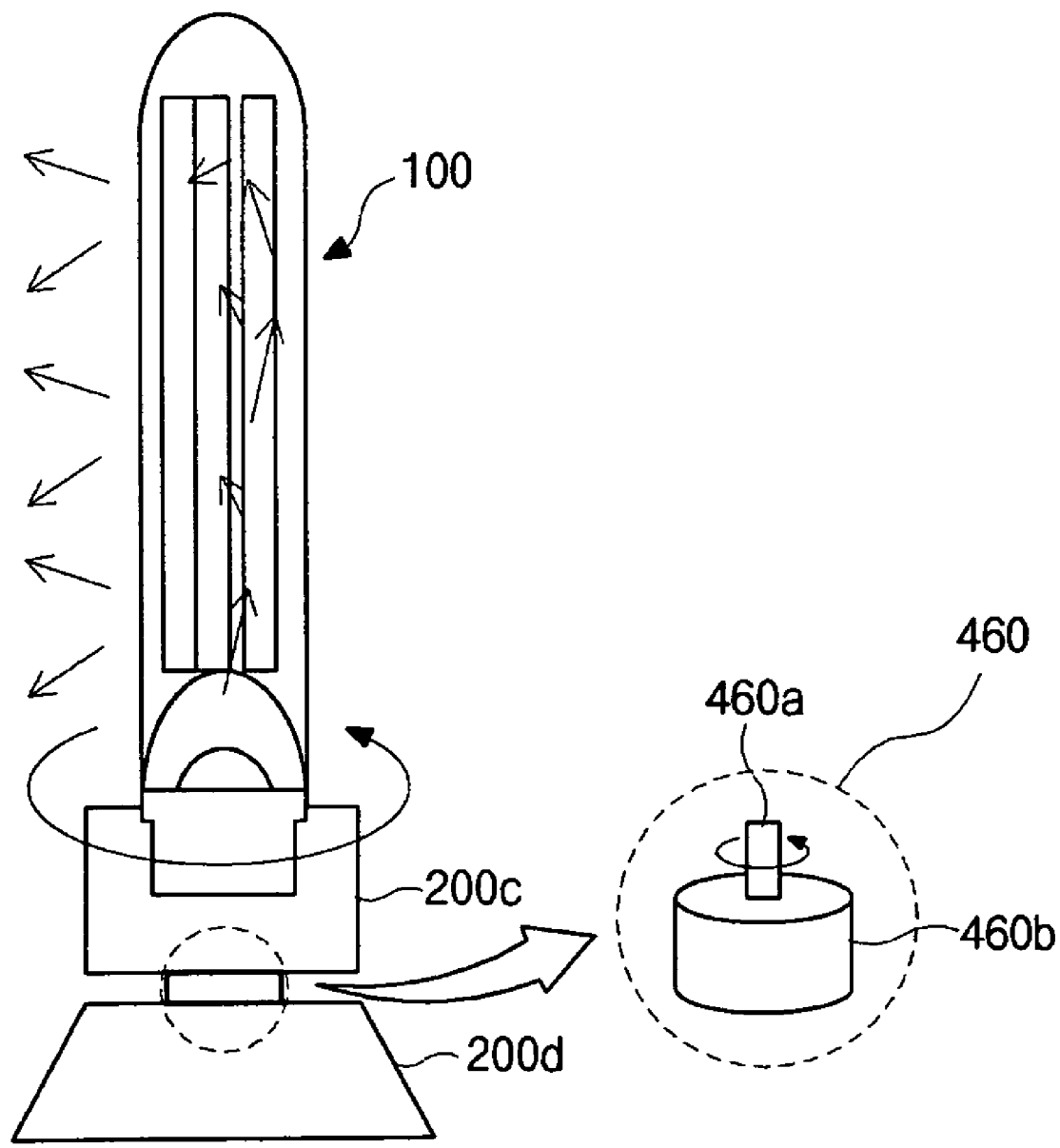
FIG. 21 is a side elevational view schematically illustrating a liquid crystal display device having a rotation system for a liquid crystal module.

FIG. 21 is a side elevational view schematically illustrating a liquid crystal display device having a rotation system for a liquid crystal module. In FIG. 21, the cradle 200 is divided into a module mount 200c and a main body 200d which are connected to each other by a rotational system 460. The liquid crystal module 100 is mounted on the module mount 200c. The rotational system 460 is installed between the module mount 200c and the main body 200d. The rotational system 460 includes a rotary axis 460a and a revolver 460b. The rotary axis 460a may be fixed to the module mount 200c, and the revolver 460b may be inserted into the main body 200d. The rotary axis 460a may be formed integrally with or separately from the revolver 460b. When the module mount 200c holds the liquid crystal module 100, only the rotary axis 460a or both the rotary axis 460a and the revolver 460b rotate. The rotational system 460 may include a plurality of bearings.

According to the present invention, since the liquid crystal display device includes cradle and a liquid crystal panel detachable from the cradle, a portable display device is achieved.

It will be apparent to those skilled in the art that various modifications and variation can be made in the detachable liquid crystal display device of the present invention without departing from the spirit or scope of the invention. Thus, it is intended that the present invention cover the modifications and variations of this invention provided they come within the scope of the appended claims and their equivalents.

What is claimed is:

1. A detachable liquid crystal display device, comprising:
   a liquid crystal module including:
   a) a liquid crystal panel;
   b) an optical sheet provided on a rear surface of the liquid crystal panel;
   c) an interface disposed on a rear surface of the liquid crystal panel and for receiving first image data and image control signals;
   d) a power receiver disposed on the rear surface of the liquid crystal panel for receiving electrical power;
   e) a memory card operatively associated with the liquid crystal module for storing the first image data; and
   f) a timing controller for receiving second image data from external devices in accordance with the image control signals and permitting the first image data stored in the memory card to be displayed in the liquid crystal panel; and
   a cradle operatively connected to the liquid crystal module and including:
   a) at least one lamp for emitting light to the optical sheet;
   b) an inverter for supplying alternating current to the lamp;
   c) a connector for receiving third image data from external equipment; and
   d) an interface converter for applying the third image data to the interface of the liquid crystal module,
   wherein the liquid crystal module is detachable from the cradle, and wherein the at least one lamp is fixed to the cradle when the liquid crystal module is detached from the cradle, and
   wherein the timing controller is controlled to display the first image data when the liquid crystal module is detached from the cradle and to display the second image data through the cradle when the liquid crystal module is coupled with the cradle.

2. The device of claim 1, wherein the interface and the interface converter adopt an LVDS (Low Voltage Differential Signaling) transmission system.

3. The device of claim 1, wherein the interface contacts the interface converter for communication.

4. The device of claim 1, wherein the connector includes a DVI (Digital Video Interface) input, an S-video input, a component input, a composite video input, and a USB (Universal Serial Bus) input.

5. The device of claim 1, wherein the liquid crystal panel is a transmissive type, and wherein the liquid crystal module further includes an additional lamp.

6. The device of claim 1, wherein the lamp is disposed in the cradle, and communicates with a side of the liquid crystal module when the liquid crystal module is coupled with the cradle.

7. The device of claim 1, wherein a plurality of lamps are utilized and disposed to correspond to the rear surface of the liquid crystal module when the liquid crystal module is coupled with the cradle.

8. The device of claim 1, wherein the memory card is one of a re-writable disk and a compact flash memory card.

9. The device of claim 1, wherein the memory card is detachable from the liquid crystal panel.

10. The device of claim 1, wherein the liquid crystal module further includes a source PCB, and wherein the memory card is integrally installed in the source PCB.

11. The device of claim 1, wherein the liquid crystal module further includes a key input for capturing displayed images and for changing the displayed images.

12. The device of claim 1, wherein the liquid crystal module further includes a re-chargeable battery that is connected to the power receiver.

13. The device of claim 1, wherein the cradle further includes a power connector for transmitting electric power to the power receiver.

* * * * *